US012579459B2

(12) United States Patent
Akhalwaya et al.

(10) Patent No.: US 12,579,459 B2
(45) Date of Patent: *Mar. 17, 2026

---

(54) QUANTUM CIRCUIT FOR TRANSFORMATION OF MIXED STATE VECTORS

(71) Applicant: International Business Machines Corporation, Armonk, NY (US)

(72) Inventors: Ismail Yunus Akhalwaya, Emmarentia (ZA); Shashanka Ubaru, Ossining, NY (US); Kenneth Lee Clarkson, Madison, NJ (US); Mark S. Squillante, Greenwich, CT (US); Vasileios Kalantzis, White Plains, NY (US); Lior Horesh, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 661 days.

This patent is subject to a terminal disclaimer.

(21) Appl. No.: 17/863,449

(22) Filed: Jul. 13, 2022

(65) Prior Publication Data

US 2024/0020563 A1 Jan. 18, 2024

(51) Int. Cl.
*G06F 30/30* (2020.01)
*G06N 10/20* (2022.01)
*G06N 10/40* (2022.01)

(52) U.S. Cl.
CPC ............. *G06N 10/40* (2022.01); *G06N 10/20* (2022.01)

(58) Field of Classification Search
CPC ......... G06N 10/40; G06N 10/20; G06N 10/60
See application file for complete search history.

(56) References Cited

U.S. PATENT DOCUMENTS 9,275,011 B2 3/2016 Svore et al.
9,430,688 B1 8/2016 Ray
(Continued)

FOREIGN PATENT DOCUMENTS

CN 110443785 A 11/2019
CN 110612540 A 12/2019
(Continued)

OTHER PUBLICATIONS

Ubaru, Shashanka et al., "Quantum Topological Data Analysis with Linear Depth and Exponential Speedup," arXiv preprint arXiv:2108. 02811, Aug. 5, 2021, 27 pages (Grace Period Disclosure).
(Continued)

*Primary Examiner* — Jack Chiang
*Assistant Examiner* — Brandon Bowers
(74) *Attorney, Agent, or Firm* — Erik Johnson; Scully, Scott, Murphy & Presser, P.C.

(57) ABSTRACT

Systems and methods for operating quantum systems are described. A controller of a quantum system can generate a command signal. The quantum system can include quantum hardware having a plurality of qubits. An interface of the quantum system can control the quantum hardware based on the command signal to sample an input vector represented by the first set of qubits, where the input vector includes mixed states with different Hamming weights. The interface can control the quantum hardware to entangle the first set of qubits to the second set of qubits, where the second set of qubits represent a count of nonzero elements in the input vector. The interface can control the quantum hardware to generate an output vector based on the entanglement of the first set of qubits to the second set of qubits, where the output vector includes one or more states having a specific Hamming weight.

25 Claims, 14 Drawing Sheets

600

(56) References Cited

U.S. PATENT DOCUMENTS

| | | | | |
|---|---|---|---|---|
| 10,311,370 | B2 | 6/2019 | Bravyi et al. | |
| 10,977,546 | B2 | 4/2021 | Gambetta et al. | |
| 11,625,637 | B2* | 4/2023 | Gidney | H03K 19/20 |
| | | | | 706/62 |
| 12,001,925 | B2* | 6/2024 | Barber | G06N 10/20 |
| 2007/0036434 | A1 | 2/2007 | Saveliev | |
| 2015/0363708 | A1 | 12/2015 | Amin et al. | |
| 2016/0191060 | A1 | 6/2016 | Mcdermott et al. | |
| 2017/0147946 | A1 | 5/2017 | Umeda | |
| 2018/0025073 | A1 | 1/2018 | Singh et al. | |
| 2018/0287788 | A1 | 10/2018 | Pitala Garca | |
| 2019/0164034 | A1 | 5/2019 | Gambetta et al. | |
| 2020/0265274 | A1 | 8/2020 | Kachman et al. | |
| 2020/0342380 | A1 | 10/2020 | Selina et al. | |
| 2020/0349050 | A1 | 11/2020 | Ghobadi et al. | |
| 2020/0349459 | A1 | 11/2020 | Cao et al. | |
| 2021/0058244 | A1* | 2/2021 | Jacak | H04L 9/0852 |
| 2021/0089953 | A1 | 3/2021 | Bocharov et al. | |
| 2021/0232960 | A1 | 7/2021 | Genin et al. | |
| 2021/0256410 | A1* | 8/2021 | Bravyi | G06N 7/08 |
| 2021/0256414 | A1 | 8/2021 | Kachman et al. | |
| 2021/0272009 | A1* | 9/2021 | Gidney | G06N 10/20 |
| 2021/0329601 | A1 | 10/2021 | Li | |
| 2021/0383022 | A1 | 12/2021 | Bennati et al. | |
| 2022/0058435 | A1 | 2/2022 | Ou et al. | |
| 2022/0084398 | A1 | 3/2022 | Zhang et al. | |
| 2022/0172050 | A1 | 6/2022 | Dalli et al. | |
| 2022/0180214 | A1 | 6/2022 | Cervantes et al. | |
| 2022/0299341 | A1 | 9/2022 | Zhang | |
| 2023/0040289 | A1 | 2/2023 | Sels et al. | |
| 2023/0080319 | A1 | 3/2023 | Zhang et al. | |
| 2023/0104188 | A1 | 4/2023 | Zilberman et al. | |
| 2023/0401792 | A1 | 12/2023 | Hofmann | |
| 2024/0020564 | A1 | 1/2024 | Ubaru et al. | |
| 2024/0020565 | A1 | 1/2024 | Ubaru et al. | |
| 2024/0022247 | A1 | 1/2024 | Ubaru et al. | |
| 2024/0028939 | A1* | 1/2024 | Akhalwaya | G06N 3/08 |
| 2024/0037304 | A1 | 2/2024 | Akhalwaya et al. | |
| 2024/0296367 | A1* | 9/2024 | Rubin | G06F 17/16 |

FOREIGN PATENT DOCUMENTS

| | | | |
|---|---|---|---|
| CN | 112651418 | A | 4/2021 |
| CN | 113204738 | A | 8/2021 |
| WO | 2014/081882 | A2 | 5/2014 |
| WO | 2020164772 | A1 | 8/2020 |
| WO | 2020/263146 | A1 | 12/2020 |

OTHER PUBLICATIONS

Hayakawa, Ryu, "Quantum Algorithm for Persistent Betti Numbers and Topological Data Analysis," arXiv preprint arXiv:2111.00433, Oct. 31, 2021, 25 pages.

Seth Lloyd, "Quantum algorithms for topological and geometric analysis of data." arXiv:1408.3106v2 [quant-ph] Dec. 15, 2015 20 pages https://arxiv.org/abs/1408.3106.

Grover L.K.: A fast quantum mechanical algorithm for database search, Proceedings, 28th Annual ACM Symposium on the Theory of Computing, (May 1996) p. 212-219 https://arxiv.org/abs/quant-ph/9605043.

Hajij, Mustafa et al., "Simplicial Complex Representation Learning," arXiv preprint arXiv:2103.04046, Feb. 22, 2022, 10 pages.

NIST, "NIST Cloud Computing Program", http://csrc.nist.gov/groups/SNS/cloud-computing/index.html, Created Dec. 1, 2016, Updated Oct. 6, 2017, 9 pages.

Horesh, L., et al., "Quantum Computing Algorithms for Decision Making Under Uncertainty", Jul. 14, 2021, 111 pages (Grace Period Disclosure).

Low, G.H., et al., "Optimal Hamiltonian Simulation by Quantum Signal Processing", arXiv:1606.02685v2, Dec. 20, 2016, 6 pages.

Van Den Berg, E., et al., "Circuit optimization of Hamiltonian simulation by simultaneous diagonalization of Pauli clusters", arXiv:2003.13599v2, Sep. 5, 2020, 28 pages.

Cade, Chris, and Ashley Montanaro. "The Quantum Complexity of Computing Schatten norms." arXiv preprint arXiv:1706.09279 (Jun. 28, 2017). 28 Pages.

Luongo, Alessandro, and Changpeng Shao. "Quantum algorithms for spectral sums." arXiv preprint arXiv:2011.06475 (Nov. 12, 2020). 24 Pages.

Gyurik, Casper, Chris Cade, and Vedran Dunjko. "Towards quantum advantage for topological data analysis." arXiv e-prints (Mar. 1, 2020): arXiv-2005. 29 Pages.

Avron, Haim, and Sivan Toledo. "Randomized algorithms for estimating the trace of an implicit symmetric positive semi-definite matrix." Journal of the ACM (JACM) 58.2 (Apr. 2010): 16 Pages.

Hutchinson, M.F., 1989. A stochastic estimator of the trace of the influence matrix for Laplacian smoothing splines. Communications in Statistics-Simulation and Computation, 18(3), pp. 1059-1076.

Brakerski, Zvika, and Shmueli, Omri "(Pseudo) Random Quantum States with Binary Phase." Theory of Cryptography Conference. Springer, Cham, Jun. 26, 2019, 21 pages.

Fitzsimons, Jack K. et al., "Improved Stochastic Trace Estimation using Mutually Unbiased Bases," arXiv preprint arXiv:1608.00117, Jul. 30, 2016, 5 pages.

Fika, Paraskevi et al., "Estimation of the Bilinear Form□ f (A) x for Hermitian Matrices," Linear Algebra and its Applications 502, 2016, pp. 140-158. (See article history for dates).

Ubaru, Shashanka, and Yousef Saad. "Fast methods for estimating the numerical rank of large matrices." International Conference on Machine Learning. PMLR, 2016. 10 Pages.

Han, I., Malioutov, D., Avron, H., & Shin, J. (2017). Approximating spectral sums of large-scale matrices using stochastic chebyshev approximations. SIAM Journal on Scientific Computing, 39(4), A1558-A1585. Mar. 9, 2017 30 Pages.

Fan, Li et al., "Spectrum-Adapted Polynomial Approximation for Matrix Functions," arXiv preprint arXiv:1808.09506, Aug. 28, 2018, 5 pages.

Han, Insu et al., "Stochastic Chebyshev Gradient Descent for Spectral Optimization," Advances in Neural Information Processing Systems 31, 2018, 11 pages.

Akhalwaya, Ismail Yunus et al., "Don't Count the Shots, Make the Shots Count: Efficient Quantum Computation of the Fermionic Boundary Operator", arXiv:2201.11510v1, Jan. 27, 2022, 16 pages.

Notice of Allowance and Fees Due (PTOL-85) Mailed on Apr. 10, 2025 for U.S. Appl. No. 17/863,524, 9 page(s).

Non-Final Rejection Mailed on Jun. 30, 2025 for U.S. Appl. No. 17/863,508, 25 page(s).

Non-Final Rejection Mailed on Aug. 22, 2025 for U.S. Appl. No. 17/863,484, 6 page(s).

United States Notice of Allowance dated Nov. 4, 2025, 17 pages, in U.S. Appl. No. 17/863,508.

A Holzner et al., "Chebyshev matrix product state approach for spectral functions", published to Physical Review B 83, 195115, May 10, 2011, 20 pages.

C. Bekas, et al., "An Estimator for the Diagonal of a Matrix", Jun. 1, 2005, 22 pages, https://www-users.cse.umn.edu/~saad/PDF/umsi-2005-082.pdf.

Cortinovis et al., "On Randomized Trace Estimates for Indefinite Matrices with an Application to Determinants", published to Foundations of Computational Mathematics, Jul. 9, 2021, 29 pages.

Costa et al., "Topological data analysis and applications", published via MIPRO, May 22-26, 2017, 06 pages.

Jonnadula et al., "On the moments of characteristic polynomials", Jun. 22, 2021, 26 pages.

Marco Taboga, "Trace of a matrix", Mar. 13, 2019, 04 pages, https://www.statlect.com/matrix-algebra/trace-of-a-matrix.

United States Non-Final Rejection dated Oct. 16, 2025, 17 pages, in U.S. Appl. No. 17/863,554.

* cited by examiner

| Dimension | State | Simplex | Vertices/Pairs Included |
|---|---|---|---|
| - | $s_0$ | ∅ | - |
| 0 | $s_1$ | $v_0$ | $v_0$ |
| | $s_2$ | $v_1$ | $v_1$ |
| | $s_3$ | $v_2$ | $v_2$ |
| | $s_4$ | $v_3$ | $v_3$ |
| 1 | $s_5$ | line($v_0, v_1$) | ($v_0, v_1$) |
| | $s_6$ | line($v_0, v_2$) | ($v_0, v_2$) |
| | $s_7$ | line($v_0, v_3$) | ($v_0, v_3$) |
| | $s_8$ | line($v_1, v_2$) | ($v_1, v_2$) |
| | $s_9$ | line($v_1, v_3$) | ($v_1, v_3$) |
| | $s_{10}$ | line($v_2, v_3$) | ($v_2, v_3$) |
| 2 | $s_{11}$ | triangle($v_0, v_1, v_2$) | ($v_0, v_1$), ($v_0, v_2$), ($v_1, v_2$) |
| | $s_{12}$ | triangle($v_0, v_1, v_3$) | ($v_0, v_1$), ($v_0, v_3$), ($v_1, v_3$) |
| | $s_{13}$ | triangle($v_0, v_2, v_3$) | ($v_0, v_2$), ($v_0, v_3$), ($v_2, v_3$) |
| | $s_{14}$ | triangle($v_1, v_2, v_3$) | ($v_1, v_2$), ($v_1, v_3$), ($v_2, v_3$) |
| 3 | $s_{15}$ | tetrahedron($v_0, v_1, v_2, v_3$) | ($v_0, v_1$), ($v_0, v_2$), ($v_0, v_3$), ($v_1, v_2$), ($v_1, v_3$), ($v_2, v_3$) |

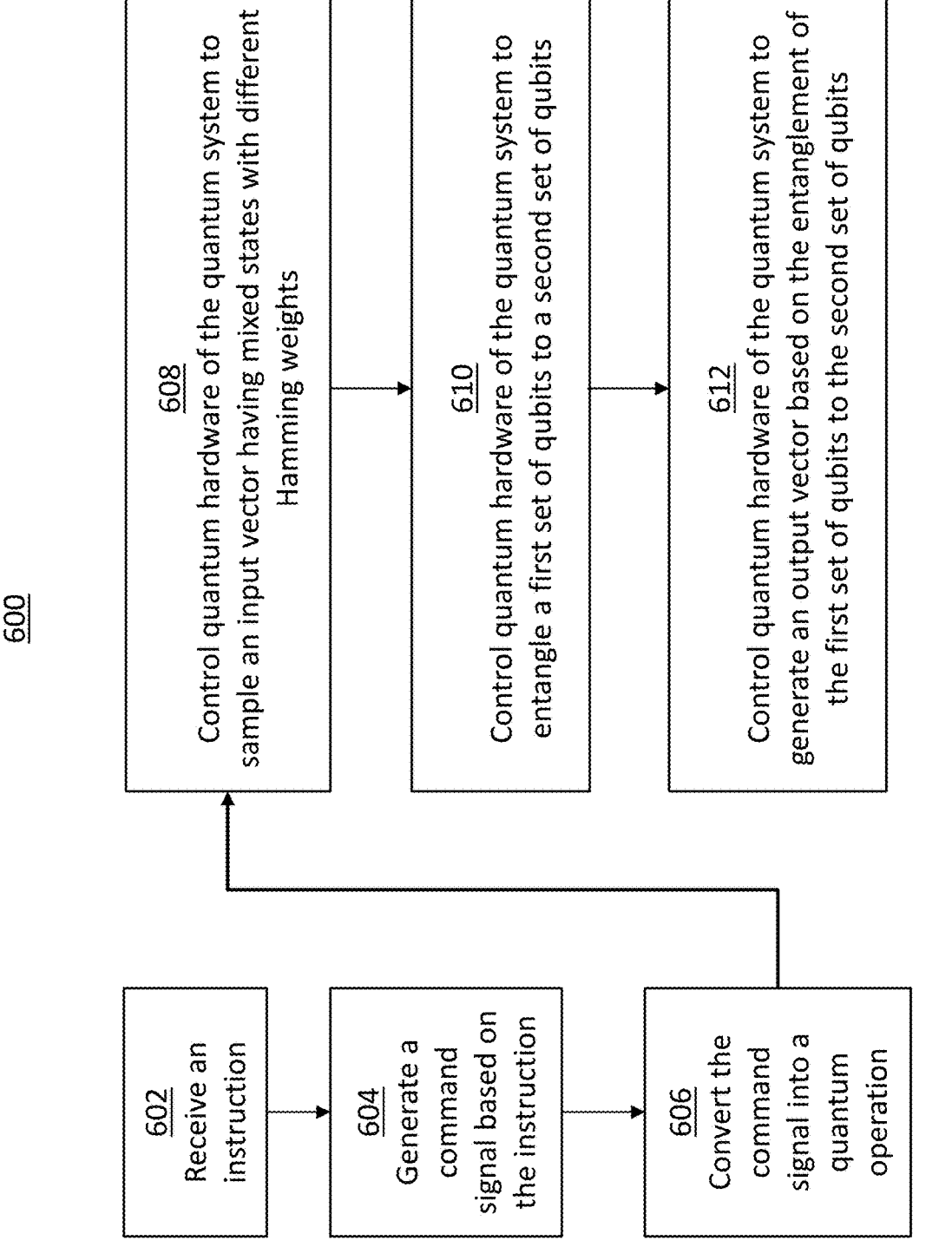

600

602
Receive an instruction

604
Generate a command signal based on the instruction

606
Convert the command signal into a quantum operation

608
Control quantum hardware of the quantum system to sample an input vector having mixed states with different Hamming weights 610
Control quantum hardware of the quantum system to entangle a first set of qubits to a second set of qubits 612
Control quantum hardware of the quantum system to generate an output vector based on the entanglement of the first set of qubits to the second set of qubits

Fig. 6

QUANTUM CIRCUIT FOR TRANSFORMATION OF MIXED STATE VECTORS

STATEMENT REGARDING FEDERALLY SPONSORED RESEARCH OR DEVELOPMENT

This invention was made with Government support under FA8750-18-C-0098 awarded by U.S. Air Force Research Lab. The Government has certain rights to this invention.

STATEMENT REGARDING PRIOR DISCLOSURES BY THE INVENTOR OR A JOINT INVENTOR

The following disclosure(s) are submitted under 35 U.S.C. 102(b)(1)(A):

Quantum Computing Algorithms for Decision Making under Uncertainty, Lior Horesh, Ken Clarkson, Vasileios Kalantzis, Mark Squillante, Shashanka Ubaru, Amir Abboud, July 2021; Quantum Topological Data Analysis with Linear Depth and Exponential Speedup, Shashanka Ubaru, Ismail Yunus Akhalwaya, Mark S. Squillante, Kenneth L. Clarkson, Lior Horesh, arXiv: 2108.02811v1, Aug. 5, 2021.

BACKGROUND

The present disclosure relates in general to systems and methods for quantum computing. In particular, the present disclosure provides a quantum system that can transform mixed state vectors into vectors having a specific state.

Classical computers use transistors to encode information in binary data, such as bits, where each bit can represent a value of 1 or 0. These 1s and 0s act as on/off switches that drive classical computer functions. If there are n bits of data, then there are $2^n$ possible classical states, and one state is represented at a time.

Quantum computers uses quantum processors that operate on data represented by quantum bits, also known as qubits. One qubit can represent the classical binary states '0', '1', and also additional states that are superposition of states of '0' and '1'. Due to the ability to represent superpositions of '0' and '1', a qubit can represent both '0' and '1' states at the same time. For example, if there are n bits of data, then $2^n$ quantum states can be represented at the same time. Further, qubits in a superposition can be correlated with each other, referred to as entanglement, where the state of one qubit (whether it is a 1 or a 0 or both) can depend on the state of another qubit, and more information can be encoded within the two entangled qubits. Based on superposition and entanglement principles, qubits can enable quantum computers to perform functions that may be relatively complex and time consuming for classical computers.

SUMMARY

In one embodiment, an apparatus for operating a quantum circuit is generally described. The apparatus can include a controller configured to generate a command signal. The apparatus can further include quantum hardware including at least a first set of qubits and a second set of qubits. The apparatus can further include an interface connected to the controller and the quantum hardware. The interface can be configured to control the quantum hardware based on the command signal received from the controller to sample the input vector represented by the first set of qubits, where the input vector includes mixed states with different Hamming weights. The interface can be configured to control the quantum hardware based on the command signal received from the controller to entangle the first set of qubits to the second set of qubits, where the second set of qubits can represent a count of nonzero elements in the input vector. The interface can be configured to control the quantum hardware based on the command signal received from the controller to generate an output vector based on the entanglement of the first set of qubits to the second set of qubits, where the output vector includes one or more states having a specific Hamming weight.

In another embodiment, a system for operating a quantum circuit is generally described. The system can include a first computing device configured to process data encoded in binary data. The system can further include a second computing device configured to be in communication with the first processor. The second computing device can be configured to process data encoded in qubits. The second computing device can include a controller configured to at least receive an instruction from the first computing device and generate a command signal based on the instruction. The second computing device can further include quantum hardware including a plurality of qubits. The second computing device can further include an interface connected to the controller and the quantum hardware. The interface can be configured to control the quantum hardware based on the command signal received from the controller to sample an input vector represented by the first set of qubits. The input vector can include mixed states with different Hamming weights. The interface can be configured to control the quantum hardware based on the command signal received from the controller to entangle the first set of qubits to the second set of qubits. The second set of qubits can represent a count of nonzero elements in the input vector. The interface can be configured to control the quantum hardware based on the command signal received from the controller to generate an output vector based on the entanglement of the first set of qubits to the second set of qubits. The output vector can include one or more states having a specific Hamming weight.

In another embodiment, a method for operating a quantum system is generally described. The method can include receiving, by a controller of a quantum system, an instruction. The method can further include generating, by the controller of the quantum system, a command signal based on the instruction. The method can further include converting, by an interface of the quantum system, the command signal into a quantum operation. The method can further include, based on the quantum operation, controlling, by the interface of the quantum system, quantum hardware of the quantum system to sample an input vector having mixed states with different Hamming weights. The method can further include, based on the quantum operation, controlling, by the interface of the quantum system, quantum hardware of the quantum system to entangle a first set of qubits to a second set of qubits. The first set of qubits can represent elements of the input vector. The second set of qubits can represent a count of nonzero elements in the input vector. The method can further include based on the quantum operation, controlling, by the interface of the quantum system, quantum hardware of the quantum system to generate an output vector based on the entanglement of the first set of qubits to the second set of qubits. The output vector can include one or more states having a specific Hamming weight.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 is a diagram illustrating a plurality of simplices that may be in a simplicial complex in one embodiment.

FIG. 6 is a flowchart of an example process that may implement a quantum circuit for transformation of mixed state vectors according to an embodiment of the disclosure.

DETAILED DESCRIPTION

Figure 1:
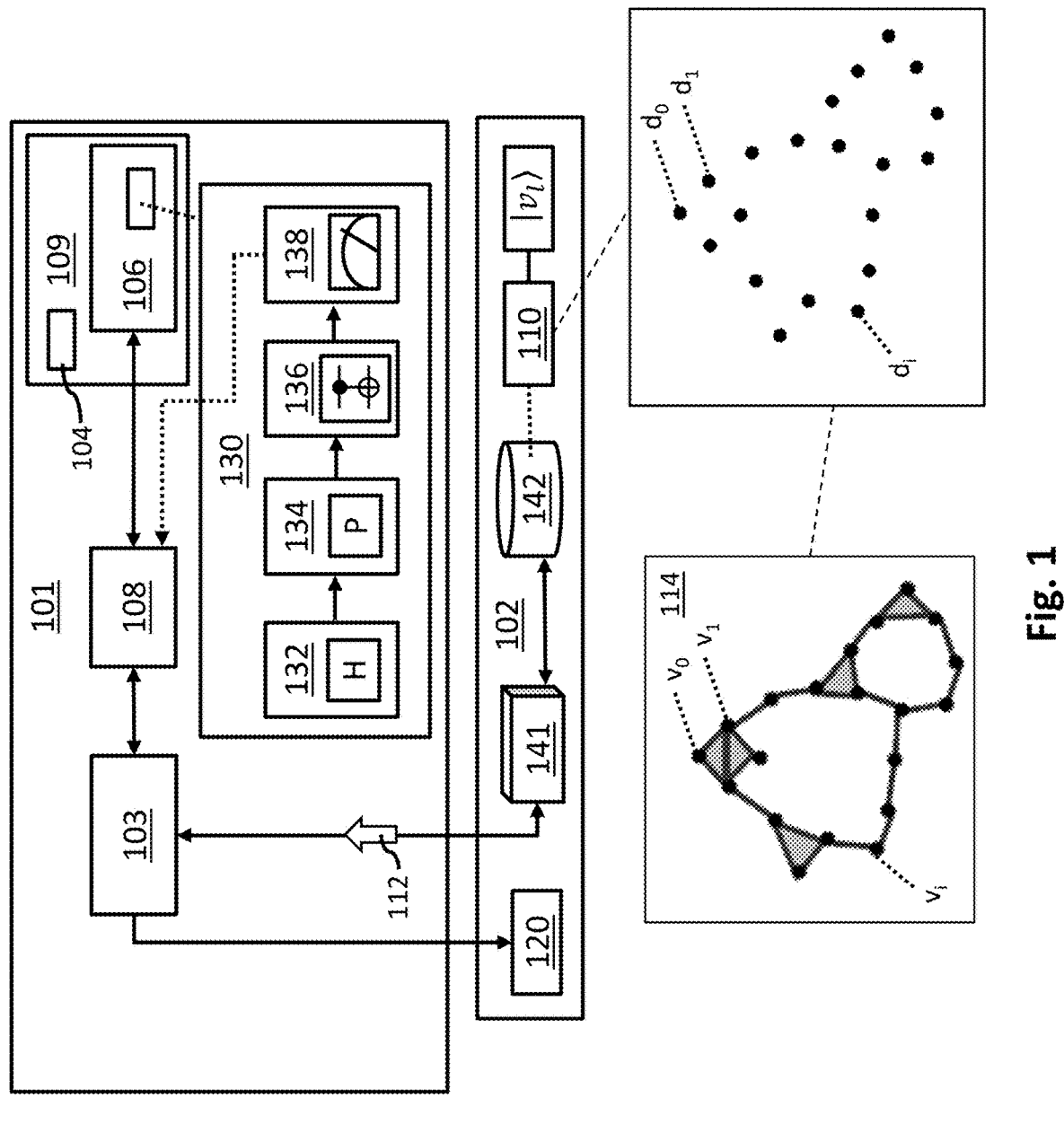
FIG. 1 is a block diagram of an example system for a quantum circuit for transformation of mixed state vectors in one embodiment.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following descriptions, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

FIG. 1 is a block diagram of an example system for a quantum circuit for transformation of mixed state vectors in one embodiment. In an aspect, a projection onto a simplicial order can be a projection, or highlight, of one or more data points in a dataset that can form a simplex of a specific simplicial order. System 100 can be a hybrid computing system including a combination of one or more quantum computers, quantum systems, and/or classical computers. In an example shown in FIG. 1, system 100 can include a quantum system 101 and a classical computer 102. In one embodiment, quantum system 101 and classical computer 102 can be configured to be in communication via one or more of wired connections and wireless connections (e.g., a wireless network). Quantum system 101 can include a quantum chipset that includes various hardware components for processing data encoded in qubits. The quantum chipset can be a quantum computing core surrounded by an infrastructure to shield the quantum chipset from sources of electromagnetic noise, mechanical vibration, heat, and other sources of noise, which tend to degrade performance. Classical computer 102 can be electronically integrated, via any suitable wired and/or wireless electronic connection, with quantum system 101.

In the example shown in FIG. 1, quantum system 101 can be any suitable set of components capable of performing quantum operations on a physical system. A quantum operation can be, for example, a quantum gate operation that manipulate qubits to interact with one another in accordance with the quantum gate operation. In the example embodiment depicted in FIG. 1, quantum system 101 can include a controller 103, an interface 108, and quantum hardware 109. In some embodiments, all or part of each of controller 103, interface 108, and quantum hardware 109 can be located in a cryogenic environment to aid in the performance of the quantum operations. Quantum hardware 109 may be any hardware capable of using quantum states to process information. Such hardware may include a plurality of qubits 104, and mechanisms to couple/entangle qubits 104, in order to process information using said quantum states. Qubits 104 may include, but are not limited to, charge qubits, flux qubits, phase qubits, spin qubits, and trapped ion qubits. Quantum hardware 109 can include a set of quantum gates 130 configured to perform quantum logic operations on qubits stored in quantum registers 104. Quantum gates 130 can include one or more single-qubit gates, two-qubit gates, and/or other multi-qubit gates.

Controller 103 can be any combination of digital computing devices capable of performing a quantum computation, such as executing a quantum circuit 106, in combination with interface 108. Such digital computing devices may include digital processors and memory for storing and executing quantum commands using interface 108. Additionally, such digital computing devices may include devices having communication protocols for receiving such commands and sending results of the performed quantum computations to classical computer 102. Additionally, the digital computing devices may include communications interfaces with interface 108. In one embodiment, controller 103 can be configured to receive classical instructions (e.g., from classical computer 102) and convert the classical instructions into commands (e.g., command signals) for interface 108. Command signals being provided by controller 103 to interface 108 can be, for example, digital signals indicating which quantum gates among quantum gates 106 needs to be applied to qubits 104 to perform a specific function (e.g., mixed state vector transformation described herein). Interface 108 can be configured to convert these digital signals into analog signals (e.g., analog pulses such as microwave pulses) that can be used for applying quantum gates on qubits 104 to manipulate interactions between qubits 104.

Interface 108 can be a classical-quantum interface including a combination of devices capable of receiving commands from controller 103 and converting the commands into quantum operations for implementing quantum hardware 109. In one embodiment, interface 108 can convert the commands from controller 103 into drive signals that can drive or manipulate qubits 104, and/or apply quantum gates on qubits 104. Additionally, interface 108 can be configured to convert signals received from quantum hardware 109 into digital signals capable of processing and transmitting by controller 103 (e.g., to classical computer 102). Devices included in interface 108 can include, but are not limited to, digital-to-analog converters, analog-to-digital converters, waveform generators, attenuators, amplifiers, optical fibers, lasers, and filters. Interface 108 can further include circuit components configured to measure a basis of the plurality of qubits following the implementation of quantum gates 130, where measurement can yield a classical bit result. For example, a basis of $|0\rangle$ corresponds to classical bit zero, and a basis of $|1\rangle$ corresponds to classical bit one. Each measurement performed by interface 108 can be read out to a device, such as classical computer 102, connected to quantum system 101. A plurality of measurement results provided by interface 108 can result in a probabilistic outcome Classical computer 102 can include hardware components such as processors and storage devices (e.g., including memory devices and classical registers) for processing data encoded in classical bits. In one embodiment, classical computer 102 can be configured to control quantum system 101 by providing various control signals, commands, and data encoded in classical bits to quantum system 101. Further, quantum states measured by quantum system 101 can be read by classical computer 102 and classical computer 102 can store the measured quantum states as classical bits in classical registers. In one embodiment of an implementation, classical computer 102 can be any suitable combination of computer-executable hardware and/or computer-executable software capable of executing a preparation module 141 to perform quantum computations with data stored in data store 142 as part of building and implementing a machine learning protocol. Data store 142 may be a repository for data to be analyzed using a quantum computing algorithm, as well as the results of such analysis. Preparation module 141 may be a program or module capable of preparing classical data from data store 142 to be analyzed as part of the implementation of a quantum circuit 106. Preparation module 141 may be instantiated as part of a larger algorithm, such as a function call of an application programming interface (API) or by parsing a hybrid classical-quantum computation into aspects for quantum and classical calculation. As described in more detail below, preparation module 141 may generate instructions for creating a quantum circuit 106 using quantum gates 130. In an embodiment, such instructions may be stored by controller 103, and may instantiate the execution of the components of interface 108 so that the quantum operations of the quantum gates 130 may be executed on quantum hardware 109.

Components of classical computer 102 are described in more detail below with reference to FIG. 7. In an example system, classical computer 102 can be a laptop computer, a desktop computer, a vehicle-integrated computer, a smart mobile device, a tablet device, and/or any other suitable classical computing device. Additionally or alternatively, classical computer 102 may also operate as part of a cloud computing service model, such as Software as a Service (SaaS), Platform as a Service (PaaS), or Infrastructure as a Service (IaaS). Classical computer 102 may also be located in a cloud computing deployment model, such as a private cloud, community cloud, public cloud, or hybrid cloud. Aspects of this embodiment are described in more detail below with reference to FIG. 10 and FIG. 11.

System 100 can be implemented to transform any given input (e.g., an input vector having mixed states, or states with different Hamming weights) to a quantum state that is a superposition of states with one specific Hamming weight. System 100 can be implemented for various applications that can utilize a transformation of an input vector to a superposition of states with a specific Hamming weight. For example, system 100 can be implemented for Topological Data Analysis (TDA). Quantum computing offers the potential of exponential speedups for certain classical computations. In an aspect, TDA can benefit from quantum computing because TDA can consume massive datasets and TDA can include reducing these massive datasets to a handful of global and interpretable signature numbers, laden with predictive and analytical value.

In an aspect, given a set of data points embedded in some ambient space, a simplicial complex can be derived from the set of data-points. A k-simplex is a collection of k+1 vertices forming a simple polytope of dimension k. For example, 0-simplices are single points (zero-dimensional), 1-simplices are line segments (one-dimensional), 2-simplices are triangles (two-dimensional), and so on. A simplicial complex is a collection of a plurality of k-simplices (of any order), and higher order simplices (e.g., higher k) can include lower order simplices. For example, a triangle simplex includes three line or edge simplices that form the triangle simplex, and also includes the three vertices (e.g., 0-simplices) connected by the three edge simplices.

Simplices in a simplicial complex $\Gamma$ can be constructed as a mixed state (e.g., superposition quantum state) in quantum computing. The mixed state simplices can be projected onto the kernel of a combinatorial Laplacian $\Delta_k$ corresponding to k-simplices of simplicial complex $\Gamma$ denoted as $\Delta_k$, in order to estimate the dimension of the kernel. The estimation of the kernel dimension allows the determination of the Betti numbers, because a k-th Betti number is a kernel dimension of the combinatorial Laplacian $\Delta_k$ corresponding to k-simplices of simplicial complex $\Gamma$.

A combinatorial Laplacian $\Delta$ corresponding to all simplices of simplicial complex $\Gamma$ can be used for determining the combinatorial Laplacian $\Delta_k$ corresponding to k-simplices. The combinatorial Laplacian $\Delta$ corresponding to all simplices of simplicial complex $\Gamma$ is denoted as:

$$\Delta = P_\Gamma B P_\Gamma B P_\Gamma$$

where $P_\Gamma$ is the projector that projects the boundary operator (or boundary map) B onto all simplices present in simplicial complex $\Gamma$. The boundary operator B can create a mapping of orders of simplices (e.g., simplices of all orders) in a given simplicial complex. That is, the boundary operator can map the vector space of k-simplices into the vector space of k−1 simplices. Projector $P_\Gamma$ is projected on a boundary operator B multiple times (e.g., three times) because boundary operator B includes a boundary conjugate that is restricted to the simplices in the simplicial complex $\Gamma$. In an example, if $P_\Gamma=I$, then $\Delta=B_2=nI$, and the kernel will be empty and will not include holes. The projector $P_\Gamma$ can be used for determining the combinatorial Laplacian $\Delta$ corresponding to all simplices that are present in simplicial complex $\Gamma$.

The combinatorial Laplacian $\Delta$ corresponding to all the simplices of simplicial complex $\Gamma$ can be used for determining the combinatorial Laplacian $\Delta_k$ corresponding to k-simplices. The combinatorial Laplacian $\Delta_k$ corresponding to k-simplices is denoted as:

$$\Delta_k=P_k\Delta P_k,$$

where $P_k$ is a projector onto all k-simplices. Since the k-Betti number is the kernel dimension of the combinatorial Laplacian, $\Delta_k$, construction of the projector $P_k$ can lead to determination of the combinatorial Laplacian $\Delta_k$ corresponding to k-simplices. The combinatorial Laplacian $\Delta_k$ corresponding to k-simplices can be used for determining the Betti numbers of simplicial complex $\Gamma$. System 100 can be implemented to project all k-simplices of a simplicial complex.

System 100, when applied to TDA, can be implemented to project all k-simplices of a simplicial complex. System 100 can project the k-simplices by transforming a plurality of random state vectors having mixed states (e.g., states with different Hamming weight), iteratively, to a quantum state that is a superposition of states with a specific Hamming weight. The Hamming weight can be equivalent to a number of nonzero elements in the random state vectors, which can also be a simplex order k.

In one embodiment, data store 142 may include a dataset 110, where a simplicial complex 114 can represent a topology of a plurality of data points among dataset 110 (e.g., in a database) and relationships between the plurality of data points. In an aspect, a vertex in simplicial complex 114 can represent a data point in dataset 110, and an edge or a line connecting two vertices can represent a relationship between the two vertices or data points, where the relationship can be one or more of a dependency, a shared attribute, and/or other types of relationships. Formation of simplicial complex 114 can be based on a determination of whether each pair of data points in dataset 110 are $\varepsilon$-close, or within a distance of $\varepsilon$ from one another. If two data points are $\varepsilon$-close, then an edge can connect the two data points to form one or more simplices of simplicial complex 114. In the example shown in FIG. 1, data points $d_0$ and $d_1$ can form an $\varepsilon$-close pair, hence they are connected by an edge as shown in simplicial complex 114. However, data points $d_0$ and $d_1$ are not $\varepsilon$-close, hence they are not connected by any edge in simplicial complex 114. In general, a k-simplex is added to simplicial complex 114 for every subset of k+1 data points that are pair-wise connected (e.g., $\varepsilon$-close). As the value of $\varepsilon$ varies, different data points may be connected to form different simplices, hence forming different simplicial complex.

Dataset 110 can include n data points ranging from $d_0$, . . . $d_{n-1}$, and simplicial complex 114 can include n vertices, ranging from $v_0$, . . . , $v_{n-1}$, representing the n data points in dataset 110. If dataset 110 has n data points, then a maximum possible number of simplices present in simplicial complex 114 is $2^n$. For example, if all $$\binom{n}{2}$$

8 pairs of vertices of simplicial complex 114 are connected with one another, then simplicial complex 114 includes $2^n$ simplices. Note that multiple simplices having the same dimension are considered as different simplices. For example, if simplicial complex 114 has n vertices, then there are n 0-simplices (e.g., single point, zero dimension simplices) in simplicial complex 114. If there are pairs of vertices that are disconnected from one another among simplicial complex 114, then the number of simplices in simplicial complex 114 will be less than $2^n$.

System 100 can be implemented to construct the projector $P_k$ that can project all k-simplices that can be formed by dataset 110 to construct simplicial complex 114. In one embodiment, the projector $P_k$ can be a quantum circuit including one or more quantum gates. Classical computer 102 can generate a set of n-bit random binary numbers 112 and send the n-bit binary number to quantum system 101. Quantum system 101 can use the n-bit random binary numbers 112 to generate a set of random state vectors, denoted as $|v_l\rangle$. Random state vectors, denoted as $|v_l\rangle$ can include random independent and identically distributed entries, where $l=1, \ldots, n_v$, and $n_v$ denotes the set of n-bit random binary numbers 112 (e.g., there are $n_v$ n-bit binary numbers). Further, each one of random state vectors $|v_l\rangle$ can be a superposition of mixed states, which is a superposition of multiple states with different Hamming weights. For example, a random state vector $|v_l\rangle$ corresponding to a vector with four elements can include sixteen states, and these sixteen states can include a mixture of states having a Hamming weight of two (e.g., $|0011\rangle$, $|1010\rangle$, etc.) and three (e.g., $|1011\rangle$, $|1101\rangle$, etc.). The parameter $n_v$ can be an input provided by classical computer 102 to quantum system 101. In one embodiment, random state vectors $|v_l\rangle$ can be random vectors with zero mean and uncorrelated coordinates. In one embodiment, random state vectors $|v_l\rangle$ can be random Hadamard state vectors sampled from a $2^n \times 2^n$ Hadamard matrix. A selection (e.g., by quantum system 101) of one of the $n_v$ n-bit binary numbers can return a random state vector $|v_l\rangle$ ). For example, given n qubits with initial state $|0\rangle$, quantum system 101 can randomly invert or flip the n qubits (e.g., by applying NOT gates), and apply Hadamard gates to all n qubits to produce a state corresponding to a random column of the $2^n \times 2^n$ Hadamard matrix. In one embodiment, if system 100 can tolerate an error of up to $\varepsilon$, then $$n_v > \frac{1}{\varepsilon^2}.$$

In an embodiment where system 100 is being used for a trace estimation application, the $n_v$ n-bit binary numbers can be based on a number of random Hadamard vectors needed for the trace estimation.

Quantum gates 130 can include gates that form a quantum circuit 106 configured to implement the projector $P_k$ that can be used for projecting simplices of order k (e.g., k-simplices) in simplicial complex 114. Interface 108 can be configured to control quantum circuit 106 based on a command signal received from controller 103. In one embodiment, interface 108 can control quantum circuit 106 by applying quantum gates (e.g., among quantum gates 130) being used for forming quantum circuit 106 on qubits 104. Quantum circuit 106 can include a set of Hadamard gates 132, a set of phase gates 134, a set of controlled-not (CNOT) gates 136, and a set of measurement circuits 138. Each Hadamard gate among Hadamard gates 132 can act on a single qubit to transform or project the qubit to a superposition quantum state. To project k-simplices in simplicial complex 114, quantum circuit 106 can randomly flip n qubits and apply n Hadamard gates 132 to all n qubits to sample random state vectors $|v_l\rangle$, where the n qubits encode or represent entries of the sampled random state vectors $|v_l\rangle$. Quantum circuit 106 can sample random state vector $|v_l\rangle$ for $n_v$ times (e.g., l=1, . . . , $n_v$), where each l-th sampled random state vector $|v_l\rangle$ can be a superposition of mixed states representing simplices (of different order k) that potentially exist in simplicial complex 114, and each l corresponds to a vertex in simplicial complex 114.

The set of phase gates 134 can change a phase of one basis state, and maintain the phase of the other basis, of a qubit being inputted to quantum circuit 106. The set of CNOT gates 136 can entangle qubits that represent a k-simplex with log (n) ancilla qubits that can be among qubits 104. The phase gates 134 and the CNOT gates 136 in quantum circuit 106 can perform a controlled-increment technique, such that the n/2 ancilla qubits can count a number of nonzero elements in the sampled random state vectors $|v_l\rangle$ (e.g., determining a Hamming weight of the sampled random state vectors $|v_l\rangle$). A nonzero element in the sampled random state vector $|v_l\rangle$ can indicate that the corresponding vertex in simplicial complex 114 is part of a simplex, and a state representing any k-simplex will have exactly k+1 nonzero elements. The entanglement of the n qubits with the ancilla qubits can be considered as entangling the k-simplex with its Hamming weight. In one embodiment, measurement circuits 138 can be configured to measure ancilla qubits entangled by the set of CNOT gates 136, and the measurement results can be provided to interface 108. Interface 108 can provide the measurement results from measurement circuits 138 to classical computer 102, via controller 103. Classical computer 102 can store the measurement results in classical registers 120.

In one embodiment, a first set of qubits among qubits 104 can be assigned to represent elements among a l-th sampled random state vector $|v_l\rangle$. A second set of qubits among qubits 104 can be assigned to represent a count of nonzero elements in the l-th sampled random state vector $|v_l\rangle$. The set of Hadamard gates 132 can act on the first set of qubits to transform the first set of qubits into superposition state and to generate the l-th sampled random state vector $|v_l\rangle$. The set of phase gates 134 can be used for applying permutations on the second set of qubits to increment the count represented by the second set of qubits. The set of CNOT gates 136 can be used for entangling the first set of qubits with the second set of qubits. In one embodiment, one or more gates among the set of phase gates 134 and the set of CNOT gates 136 can form controlled-rotation gates, such that states of the second set of qubits can be controlled by corresponding entangled qubits among the first set of qubits. The control from the first set of qubits on the second set of qubits can be dependent on whether the states among random state vector $|v_l\rangle$ include nonzero elements or not.

In one embodiment, an output of quantum circuit 106 can be a vector having Dicke states of a specific Hamming weight (e.g., k+1), such that the outputted vector represents a number of k-simplices in random state vector $|v_l\rangle$. In an aspect, a vector having Dicke states is a vector having a superposition of states, with equal probability, that has a specific Hamming weight (e.g., not mixed states). After $n_v$ iterations of running quantum circuit 106, the number of k-simplices in each random state vector $|v_l\rangle$ can be averaged over $n_v$ to estimate a total number of k-simplices in simplicial complex 114. The second set of qubits can represent a count indicating the number of nonzero elements in random state vector $|v_l\rangle$. Measurement circuit 138 can measure the second set of qubits to output the count of nonzero elements. If the count is k+1 (e.g., corresponding to the simplex order of interest k), then the value of k+1 can be provided to another processor (e.g., another quantum circuit, or classical computer 102, depending on the application of system 100) to track a number of k-simplices in simplicial complex 114 (e.g., increment a count of k-simplices). If the count is not k+1 (e.g., not equivalent to the simplex order of interest k), then quantum circuit 101 can sample a next random state vector, such as $|v_{l+1}\rangle$, without outputting the value that is not k+1, and count the number of nonzero elements in $|v_{l+1}\rangle$. Hence, the second set of qubits in quantum circuit 106 can count a number of k-simplices in simplicial complex 114, effectively implementing quantum circuit as a projector $P_k$ that projects simplices of order k. In an aspect, quantum circuit 106 can include log(n) ancilla qubits, and by can include quantum logic gates that implement quantum Fourier transforms (QFT) (see FIG. 3 to FIG. 5C below). Hence, a total number of quantum logic gates in quantum circuit 106 can be $O(\log^2 n)$ gates, resulting in a relatively short circuit depth of $O(\log^2 n)$.

In one embodiment, the vector being outputted by quantum circuit 106 can be probabilistic, such as having a probability of being a vector that include one or more states with k+1 nonzero elements. For example, $|v_l\rangle$ can include a mixture of states with two nonzero elements (e.g., 1-simplices) and states with three nonzero elements (e.g., 2-simplices), and quantum circuit 106 is configured to project 1-simplices. Quantum circuit 106 can produce either a first vector with a superposition of states with two nonzero elements (e.g., Dicke states with two nonzero elements), or a second vector with a superposition of states with three nonzero elements (Dicke states with three nonzero elements). Measurement circuit 138 can measure the second set of qubits and a result of the measurement can indicate whether the 1-simplices or 2-simplices are being projected by quantum circuit 106. For example, if the measurement collapse to the first vector, then the measurement result indicates that quantum circuit 106 is projecting onto 1-simplices. If the measurement collapse to the second vector, then the measurement result indicates that quantum circuit 106 is projecting onto 2-simplices. Hence, quantum circuit 106 can transform the input random state vector $|v_l\rangle$ to one or more vectors having Dicke states with of one or more different nonzero elements (or elements that are '1'), and measurement of the second set of qubits can output a result indicating which order of simplices is being projected by quantum circuit 106.

In embodiments where system 100 is implemented for TDA applications, quantum circuit 106 can be implemented for multiple iterations and quantum system 101 can initialize system 100 prior to the multiple iterations. For example, quantum system 101 can implement or operate a deterministic quantum circuit (e.g., a quantum circuit that does not utilize ancilla qubits) to determine a deterministic or fixed value of k. As a result of initializing system 100 to determine the fixed value of k, quantum circuit 106 can generate output vectors that has Dicke states of k+1, k, or k+2 nonzero elements corresponding to the fixed value of k, k−1, or k+1, respectively. This initialization can reduce a randomless of the output vectors generated by quantum circuit 130. For example, the output vectors can have Dicke states corresponding to k−1, k, or k+1, and not values that are less than k−1 or greater than k+1.

FIG. 2 is a diagram illustrating a plurality of simplices that may be in a simplicial complex in one embodiment. A simplicial complex 200 including four vertices (e.g., n=4) is shown in FIG. 2. Simplicial complex 200 includes vertices $v_0$, $v_1$, $v_2$, $v_3$ and all vertices are connected to one another (e.g., all pairs are ε-close pairs). As a result of all vertices being connected to one another, simplicial complex 200 includes $2^n$ simplices, or 16 simplices (e.g., $2^4=16$). Each simplex among simplicial complex 200 can correspond to a simplex of a specific dimension. For example, simplicial complex 200 can include a simplex Ø that has no dimension, four zero-dimension simplices (0-simplices), six one-dimension simplices (1-simplices), four two-dimension simplices (2-simplices), and one three-dimension simplex (3-simplices).

The simplex Ø can be represented as a state $s_0$. The four 0-simplices are represented as states $s_1$, $s_2$, $s_3$, $s_4$, where states $s_1$, $s_2$, $s_3$, $s_4$ include the vertices $v_0$, $v_1$, $v_2$, $v_3$, respectively. The six 1-simplices are represented as states $s_5$, $s_6$, $s_7$, $s_8$, $s_9$, $s_{10}$, where states $s_5$, $s_6$, $s_7$, $s_8$, $s_9$, $s_{10}$ include the pairs of vertices $(v_0, v_1)$, $(v_0, v_2)$, $(v_0, v_3)$, $(v_1, v_2)$, $(v_1, v_3)$, $(v_2, v_3)$, respectively. The four 2-simplices are represented as states $s_{11}$, $s_{12}$, $s_{13}$, $s_{14}$, where states $s_{11}$, $s_{12}$, $s_{13}$, $s_{14}$, include the pairs of vertices $(v_0, v_1)$, $(v_0, v_2)$, $(v_1, v_2)$; $(v_0, v_1)$, $(v_0, v_3)$, $(v_1, v_3)$; $(v_0, v_2)$, $(v_0, v_3)$, $(v_2, v_3)$; and $(v_1, v_2)$, $(v_1, v_3)$, $(v_2, v_3)$, respectively. The one 3-simplex is represented as state $s_{15}$, where state $s_{15}$ includes the pairs of vertices $(v_0, v_1)$, $(v_0, v_2)$, $(v_0, v_3)$, $(v_1, v_2)$, $(v_1, v_3)$, $(v_2, v_3)$.

Figure 3:
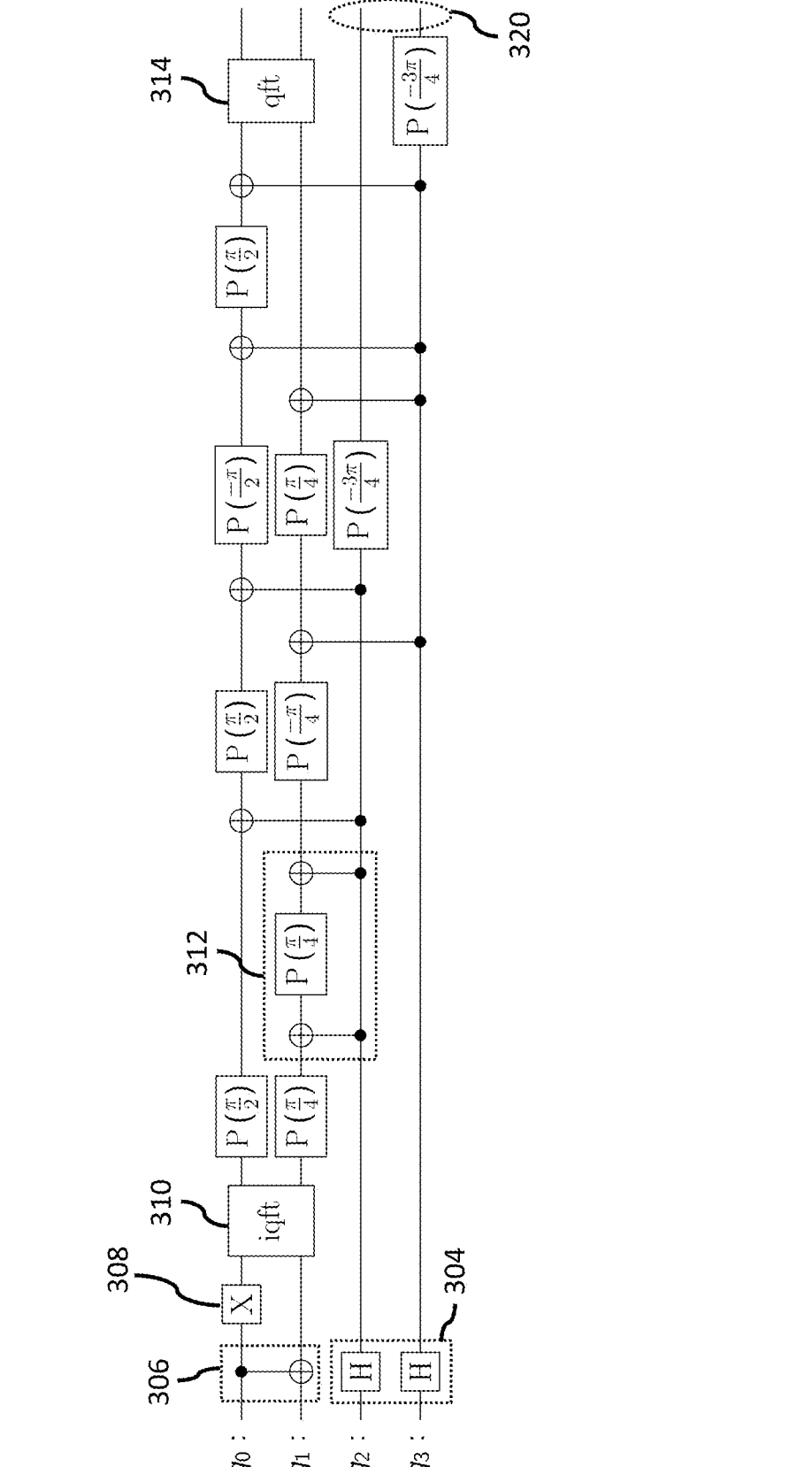
FIG. 3 is a diagram illustrating an example quantum circuit that can be implemented as a quantum circuit for transformation of mixed state vectors in one embodiment.

FIG. 3 is a diagram illustrating an example quantum circuit 300 that can be implemented as a quantum circuit for transformation of mixed state vectors in one embodiment. Quantum circuit 300 can be a circuit that can be implemented to project, or determine a number of, edges or lines (e.g., 1-simplices) in a simplicial complex. Two qubits, $q_0$ and $q_1$, can be assigned as count registers, where $q_0$ is the most significant bit, and two qubits $q_2$ and $q_3$ can be assigned as simplices registers. Qubits $q_2$ and $q_3$ can represent elements of the l-th sampled random state vector $|v_l\rangle$ corresponding to an l-th vertex in a simplicial complex. Qubits $q_0$ and $q_1$ can be controlled by qubits $q_2$ and $q_3$, and states of $q_0$ and $q_1$ can represent a permutation corresponding to a count of nonzero elements (e.g., Hamming weight) among the l-th sampled random state vector $|v_l\rangle$ represented by qubits $q_2$ and $q_3$. In one embodiment, random state vector $|v_l\rangle$ being inputted to quantum circuit 300 can be a superposition of mixed states having equal probability. An output of circuit 300, such as an output vector 320, can be a vector having a Dicke state for a random Hamming weight. For example, a random state vector $|v_l\rangle$ being inputted to quantum circuit 300 can include X states having two nonzero elements, and Y states having three nonzero elements. A measurement of qubits $q_0$ and $q_1$ can have a probability of X/(X+Y) outputting a vector having states with two nonzero elements, and a probability of Y/(X+Y) outputting an output vector 320 having states with three nonzero elements. Since quantum circuit 300 is implemented to project edges, the value of k (e.g., simplicial order of interest) corresponding to quantum circuit 300 can be k=1, and the number of nonzero elements in $|v_l\rangle$ corresponding an edges is k+1=2. The probability of output vector 320 having states with k+1 nonzero elements can be proportional to a number of simplices of order k in simplicial complex 114. In one embodiment, quantum circuit 300 can be implemented for $n_v$ iterations (e.g., for $n_v$ random state vectors) to count nonzero elements in $n_v$ random state vectors $|v_l\rangle$. In each iteration, quantum circuit 300 can count nonzero elements in the l-th random state vector $|v_l\rangle$. The count of nonzero elements from each iteration can be provided to classical computer 102, and classical computer 102 can average the counts over $n_v$ to estimate a total number of k-simplices in simplicial complex 114. In one embodiment, quantum circuit 300 can provide output vector 320 to another quantum circuit. For example, if quantum circuit 300 is being implemented for a trace estimation application, quantum circuit 300 can provide output vector 320 to a trace estimation circuit. In one embodiment, the number of ancilla qubits being assigned as count qubits can be based on a fixed value of k determined by an initialization of system 100 (e.g., initialization using deterministic quantum circuit, as described above). For example, the count qubits can represent k, k+1, or k+2 nonzero elements corresponding to k−1, k (fixed value from initialization), or k+1. Hence, for k being fixed at the value of 1 (e.g., edges), two ancilla qubits representing counts of 0, 1, 2, 3 nonzero elements can be sufficient.

Quantum circuit 300 can include Hadamard gates 304 that act on qubits $q_2$ and $q_3$. Hadamard gates 304 can transform qubits $q_2$ and $q_3$ into superposition states. Qubits $q_0$ and $q_1$ can be entangled, such as by a CNOT gate 306. One of the count qubits, such as $q_0$, can be inverted by a NOT gate 308. The inverted qubit $q_0$ and the qubit $q_1$ can be inputted to an inverted quantum Fourier transform (iqft) gate 310. A plurality of phase gates and CNOT gates can entangle qubits $q_0$ and $q_1$ with qubits $q_2$ and $q_3$, such that states of $q_2$ and $q_3$ can control phase changes of qubits $q_0$ and $q_1$. For example, a block 312 can include a phase gate to rotate qubit $q_1$ 45° about the z-axis of the Bloch sphere, and the phase gate is situated between two CNOT gates entangling qubits $q_1$ and $q_2$. Qubit $q_2$ can be the controlling qubit and qubit $q_1$ can be the target qubit. If qubit $q_2$ has a state of $|0\rangle$, then the block 312 will not change the state of qubit $q_1$. If qubit $q_2$ has a state of $|1\rangle$, then the phase gate in block 312 will rotate qubit $q_1$, thus block 312 effectively functions as a controlled-rotation gate. In response to a completion of the conditional permutations implemented by the CNOT gates and phase gates, qubits $q_0$ and $q_1$ can be inputted to a quantum Fourier transform (qft) gate 314. In one embodiment, outputs from the qft gate 314 can be measured or collapsed by measurement circuits (e.g., measurement circuits 138 in FIG. 1).

Based on entanglement of qubits $q_0$ and $q_1$ with qubits $q_2$ and $q_3$, and operations of the controlled-rotation gates, quantum circuit 300 can increment a count represented by qubits $q_0$ and $q_1$ in response to specific states of qubits $q_2$ and $q_3$. For example, if at least one of qubits $q_2$ and $q_3$ has a state of $|1\rangle$, the count represented by qubits $q_0$ and $q_1$ can increment by one, such as transitioning from $|00\rangle$ to $|01\rangle$. If both qubits $q_2$ and $q_3$ has a state of $|1\rangle$, the count represented by qubits $q_0$ and $q_1$ can increment by two, such as transitioning from $|00\rangle$ to $|10\rangle$. Hence, the plurality of controller-rotation gates similar to block 312 can collectively form a controlled-increment quantum circuit (e.g., quantum circuit 300). The controlled-increment on the count qubits $q_0$ and $q_1$, performed by quantum circuit 300, can be used for determining a number of nonzero elements, or a Hamming weight, in the l-th sampled random state vector $|v_l\rangle$ corresponding to the l-th vertex of a simplicial complex. The entanglement of the qubits $q_2$ and $q_3$ to qubits $q_0$ and $q_1$ can be considered as entanglement of 1-simplices to its Hamming weight.

Figure 4A:
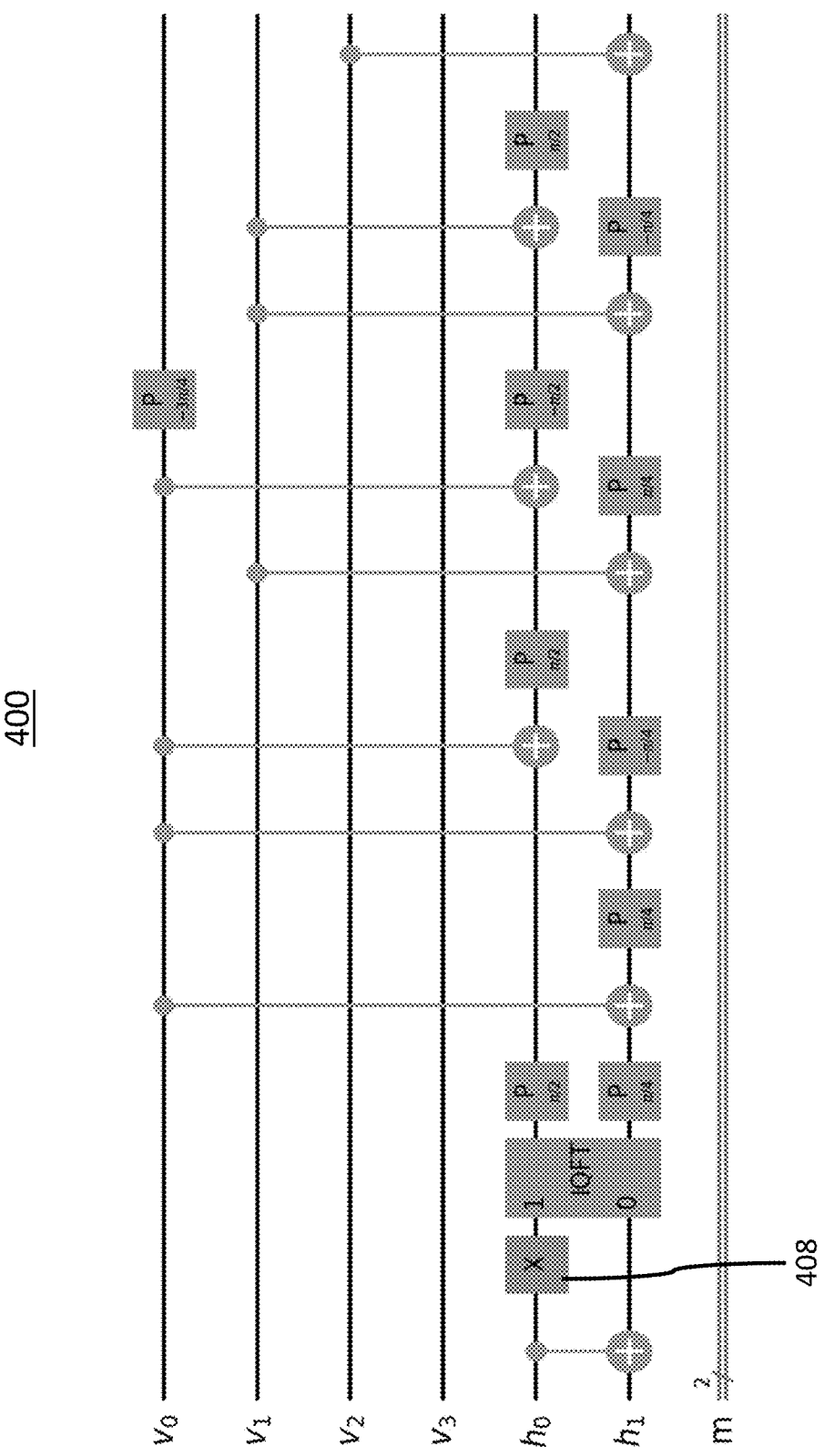
FIG. 4A is a diagram illustrating a first portion of an example quantum circuit that can be implemented as a quantum circuit for transformation of mixed state vectors in one embodiment.
Figure 4B:
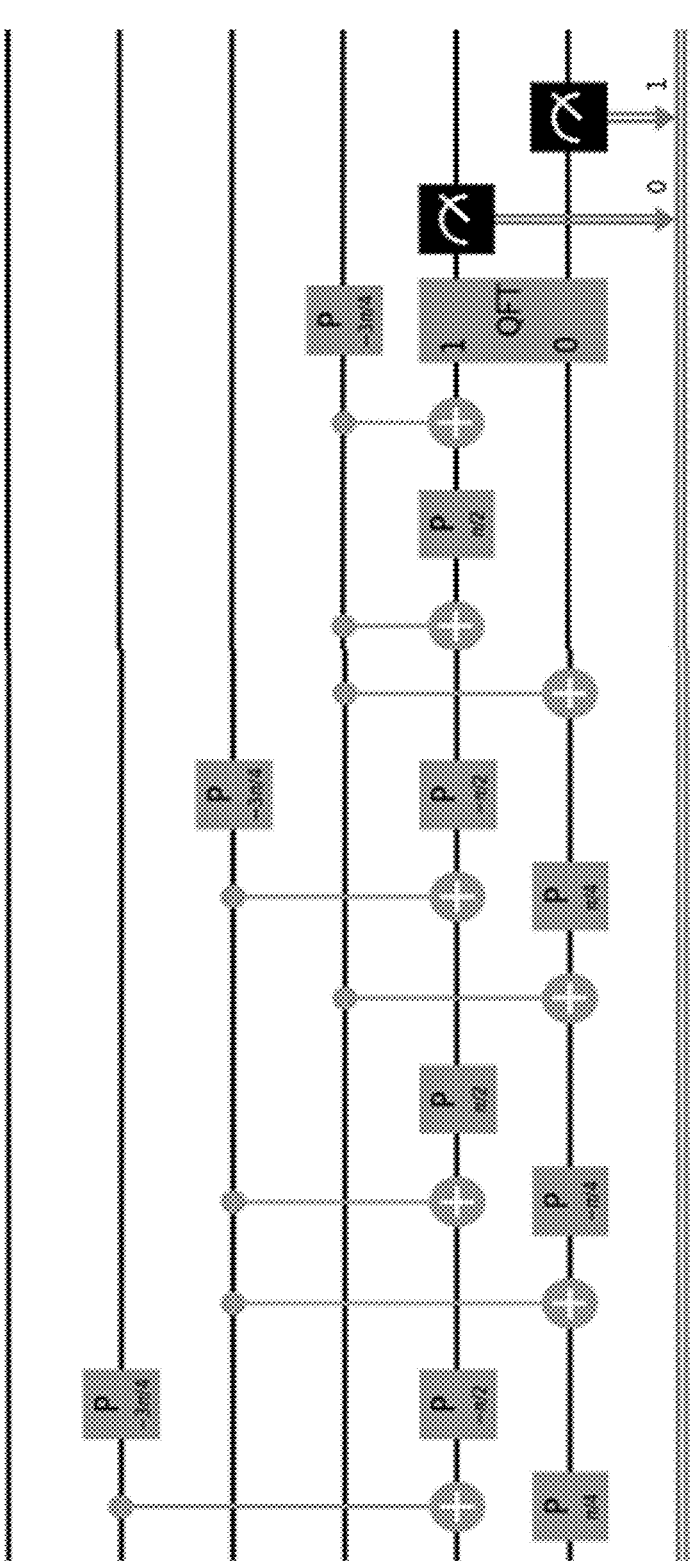
FIG. 4B is a diagram illustrating a second portion of the example quantum circuit in FIG. 4A that can be implemented as a quantum circuit for transformation of mixed state vectors in one embodiment.

FIG. 4A and FIG. 4B are diagrams illustrating an example quantum circuit 400 that can be implemented as a quantum circuit for transformation of mixed state vectors in one embodiment. FIG. 4A shows a first portion of quantum circuit 400 and FIG. 4B shows a second portion of quantum circuit 400, where the second portion is a continuation of the first portion. Two qubits, $h_0$ and $h_1$, can be assigned as count registers, and four qubits $v_0$, $v_1$, $v_2$ and $v_3$ can be assigned as simplices registers. Qubits $v_0$, $v_1$, $v_2$ and $v_3$ can represent the l-th sampled random state vector $|v_l\rangle$ corresponding to an l-th vertex in a simplicial complex. Qubits $h_0$ and $h_1$ can be controlled by qubits $v_0$, $v_1$, $v_2$ and $v_3$, and states of $h_0$ and $h_1$ can represent a permutation corresponding to a count of nonzero elements (e.g., Hamming weight) among the elements of the l-th sampled random state vector $|v_l\rangle$ represented by qubits $v_0$, $v_1$, $v_2$ and $v_3$.

Qubits $h_0$ and $h_1$ can be entangled with qubits $v_0$, $v_1$, $v_2$ and $v_3$ by CNOT gates. One of the count qubits, such as $h_0$, can be inverted by a NOT gate 408. The inverted qubit $h_0$ and the qubit $h_1$ can be inputted to an inverted quantum Fourier transform (iqft) gate. A plurality of phase gates and CNOT gates can entangle qubits $h_0$ and $h_1$ with qubits $v_0$, $v_1$, $v_2$ and $v_3$, such that states of $v_0$, $v_1$, $v_2$ and $v_3$ can control phase changes of qubits $h_0$ and $h_1$. Based on entanglement of qubits $h_0$ and $h_1$ with qubits $v_0$, $v_1$, $v_2$ and $v_3$, and operations of the controlled-rotation gates, quantum circuit 400 can increment a count represented by qubits $h_0$ and $h_1$ in response to specific states of qubits $v_0$, $v_1$, $v_2$ and $v_3$. The controlled-increment on the count qubits $h_0$ and $h_1$, performed by quantum circuit 400, can be used for determining a number of nonzero elements, or a Hamming weight, in the l-th sampled random state vector $|v_l\rangle$ corresponding to an l-th vertex in a simplicial complex. In response to a completion of the conditional permutations implemented by the CNOT gates and phase gates, qubit $h_0$ and $h_1$ can be inputted to a quantum Fourier transform (qft) gate, and outputs from the qft gate can be measured or collapsed by measurement circuits (e.g., measurement circuits 138 in FIG. 1).

Figure 5A:
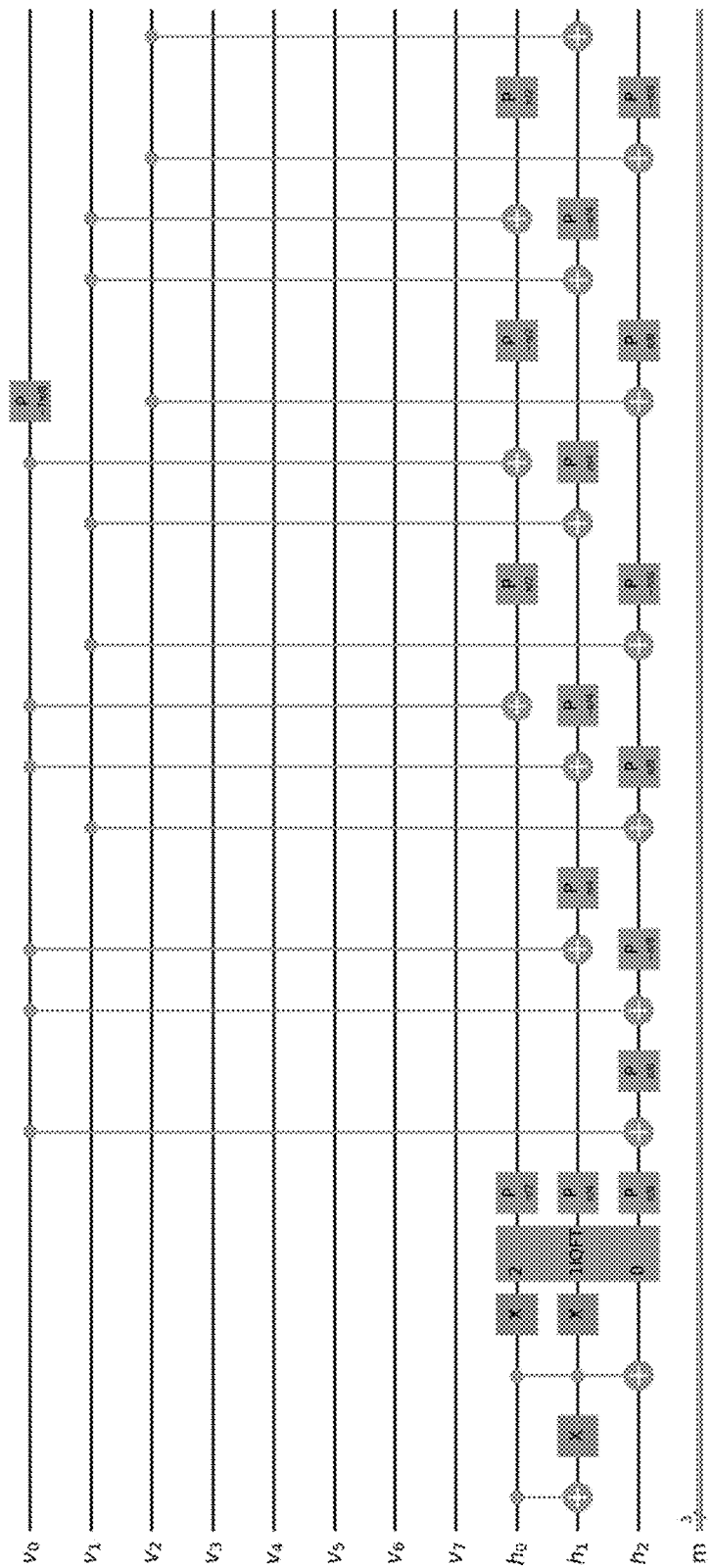
FIG. 5A is a diagram illustrating a first portion of another example quantum circuit that can be implemented as a quantum circuit for transformation of mixed state vectors in one embodiment.
Figure 5B:
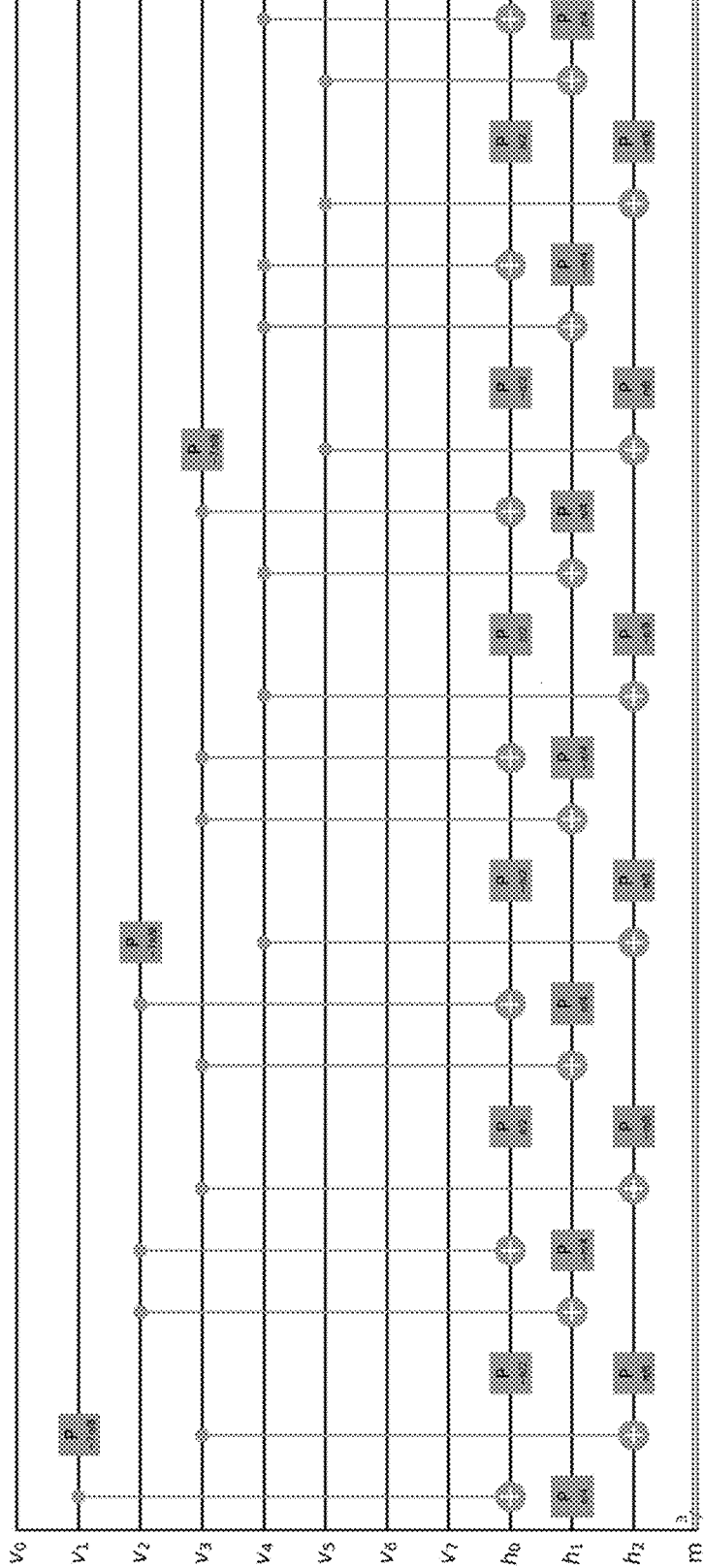
FIG. 5B is a diagram illustrating a second portion of the example quantum circuit in FIG. 5A that can be implemented as a quantum circuit for transformation of mixed state vectors in one embodiment.
Figure 5C:
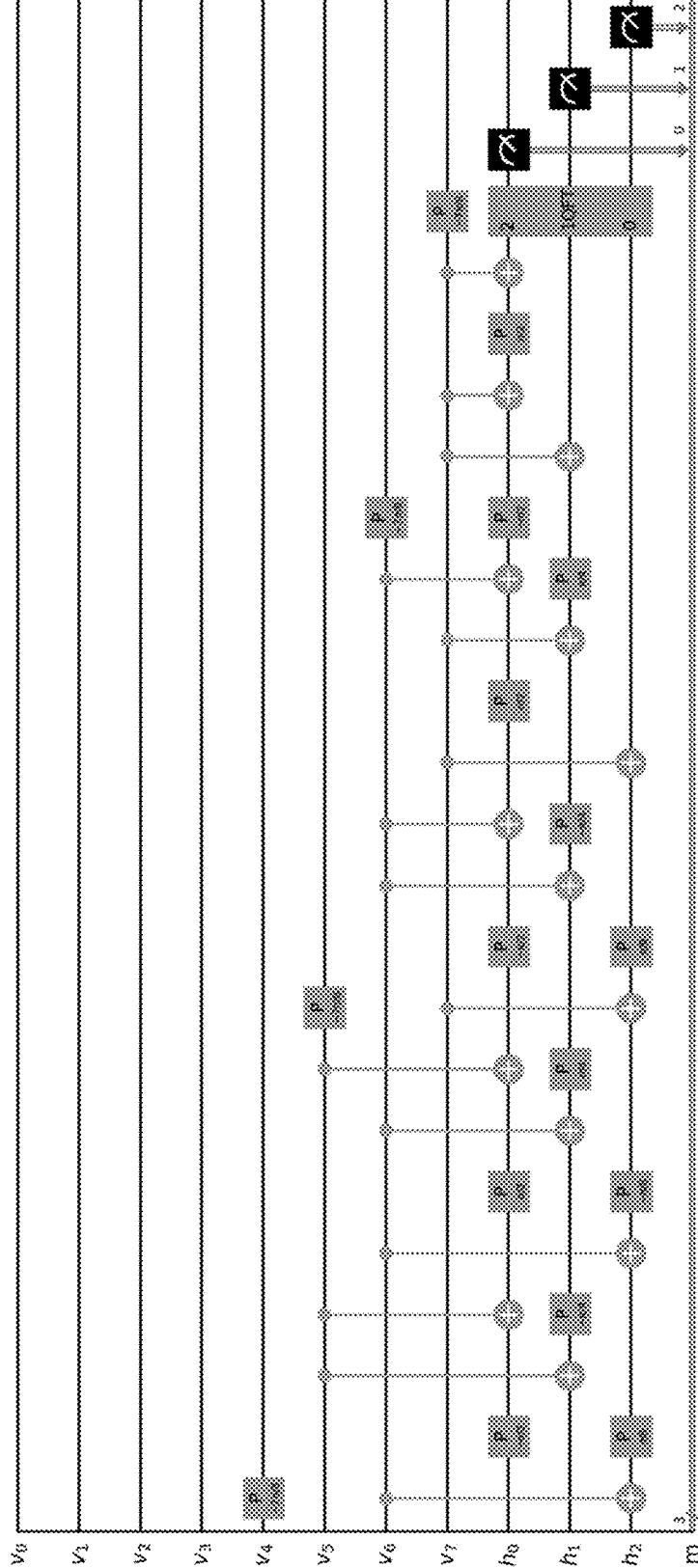
FIG. 5C is a diagram illustrating a third portion of the example quantum circuit in FIG. 5A that can be implemented as a quantum circuit for transformation of mixed state vectors in one embodiment.

FIG. 5A, FIG. 5B and FIG. 5C are diagrams illustrating an example quantum circuit 500 that can be implemented as a quantum circuit for transformation of mixed state vectors in one embodiment. FIG. 5A shows a first portion of quantum circuit 500, FIG. 5B shows a second portion of quantum circuit 500, and FIG. 5C shows a third portion of quantum circuit 500, where the second portion is a continuation of the first portion and the third portion is a continuation of the second portion. Three qubits, $h_0$, $h_1$ and $h_2$, can be assigned as count registers, and eight ubits $v_0$, . . . $v_7$ can be assigned as simplices registers. Qubits $v_0$, . . . $v_7$ can represent elements of the l-th sampled random state vector $|v_l\rangle$ corresponding to an l-th vertex in a simplicial complex. Qubits $h_0$, $h_1$ and $h_2$ can be controlled by qubits $v_0$, . . . $v_7$, and states of $h_0$, $h_1$ and $h_2$ can represent a permutation corresponding to a count of nonzero elements (e.g., Hamming weight) among the l-th sampled random state vector $|v_l\rangle$ represented by qubits $v_0$, . . . $v_7$.

Qubits $h_0$, $h_1$ and $h_2$ can be entangled with qubits $v_0$, . . . $v_7$ by CNOT gates. A plurality of phase gates and CNOT gates can entangle qubits $h_0$, $h_1$ and $h_2$ with qubits $v_0$, . . . $v_7$, such that states of $v_0$, . . . $v_7$ can control phase changes of qubits $h_0$, $h_1$ and $h_3$. Based on entanglement of qubits $h_0$, $h_1$ and $h_2$ with qubits $v_0$, . . . $v_7$, and operations of the controlled-rotation gates, quantum circuit 400 can increment a count represented by qubits $h_0$, $h_1$ and $h_2$ in response to specific states of qubits $v_0$, . . . $v_7$. The controlled-increment on the count qubits $h_0$, $h_1$ and $h_2$, performed by quantum circuit 400, can be used for determining a number of nonzero elements, or a Hamming weight, in the l-th sampled random state vector $|v_l\rangle$ corresponding to an l-th vertex in a simplicial complex. In response to a completion of the conditional permutations implemented by the CNOT gates and phase gates, qubit $h_0$, $h_1$ and $h_2$ can be inputted to a quantum Fourier transform (qft) gate, and outputs from the qft gate can be measured or collapsed by measurement circuits (e.g., measurement circuits 138 in FIG. 1).

In an aspect, noisy intermediate-scale quantum (NISQ) processors are quantum processors that include approximately fifty to a few hundred qubits, but might not reach fault-tolerance. NISQ algorithms can be algorithms designed for NISQ processors, and can be hybrid algorithms that use NISQ processors but with reduced calculation load by implementing some parts of the algorithms in classical processors. NISQ algorithms may require error mitigation techniques to recover useful data. The controlled-increment described herein need not require quantum random access memory (QRAM) or fault-tolerance quantum computers, and can be NISQ compatible.

FIG. 6 is a flowchart of an example process 600 that may implement a quantum circuit for transformation of mixed state vectors according to an embodiment of the disclosure. Example process 600 may include one or more operations, actions, or functions as illustrated by one or more of blocks 602, 604, 606, 608, 610, and/or 612. Although illustrated as discrete blocks, various blocks can be divided into additional blocks, combined into fewer blocks, eliminated, performed in different order, or performed in parallel, depending on the desired implementation.

Process 600 can be implemented by a computing device configured to process data encoded in qubits (e.g., quantum system 101 described herein). Process 600 can begin at block 602. At block 602, a controller of a quantum system can receive an instruction. Process 600 can proceed from block 602 to block 604. At block 604, the controller of the quantum system can generate a command signal based on the instruction. Process 600 can proceed from block 604 to block 606. At block 606, an interface of the quantum system can convert the command signal into a quantum operation. Process 600 can proceed from block 606 to block 608. At block 608, the computing device can sample an input vector having mixed states with different Hamming weights. Process 600 can proceed from block 608 to block 610. At block 610, the computing device can entangle a first set of qubits to a second set of qubits. The first set of qubits can represent elements of the input vector, and the second set of qubits can represent a count of nonzero elements in the input vector.

Process 600 can proceed from block 610 to block 612. At block 612, the computing device can generate an output vector based on the entanglement of the first set of qubits to the second set of qubits. The output vector can include one or more states having a specific Hamming weight. In one embodiment, the input vector can correspond to a dataset comprising a plurality of data points and a topology of the dataset can be represented by a simplicial complex. The simplicial complex can include n vertices. The first set of qubits can include n qubits and the second set of qubits can include log(n) qubits. The output vector can project simplices of an order k the simplicial complex based on the entanglement of the first set of qubits and the second set of qubits.

In one embodiment, the computing device can transform the first set of qubits into superposition quantum state. The computing device can entangle the first set of qubits in superposition quantum state to the second set of qubits. The computing device can perform phase change on the second set of qubits based on states of the first set of qubits. The phase change can increment the count represented by the second set of qubits. In one embodiment, the computing device can receive a set of random binary numbers. The computing device can generate a set of random state vectors based on the set of random binary numbers. The computing device can iteratively sample a random state vector among the set of random state vectors. The sampled random state vector can be the input vector. In one embodiment, the computing device can sample the random state vector by randomly inverting one or more of the first set of qubits and applying the set of Hadamard gates to the first set of qubits to produce the random state vector.

In one embodiment, the computing device can generate a vector that includes one or more states having a random Hamming weight. The computer device can measure the second set of qubits. In response to a result of the measurement indicating the random Hamming weight is same as the specific Hamming weight, the computing device can output the generated vector as the output vector. In response to a result of the measurement indicating the random Hamming weight is different from the specific Hamming weight, the computing device can sample a next input vector without generating the output vector.

Figure 7:
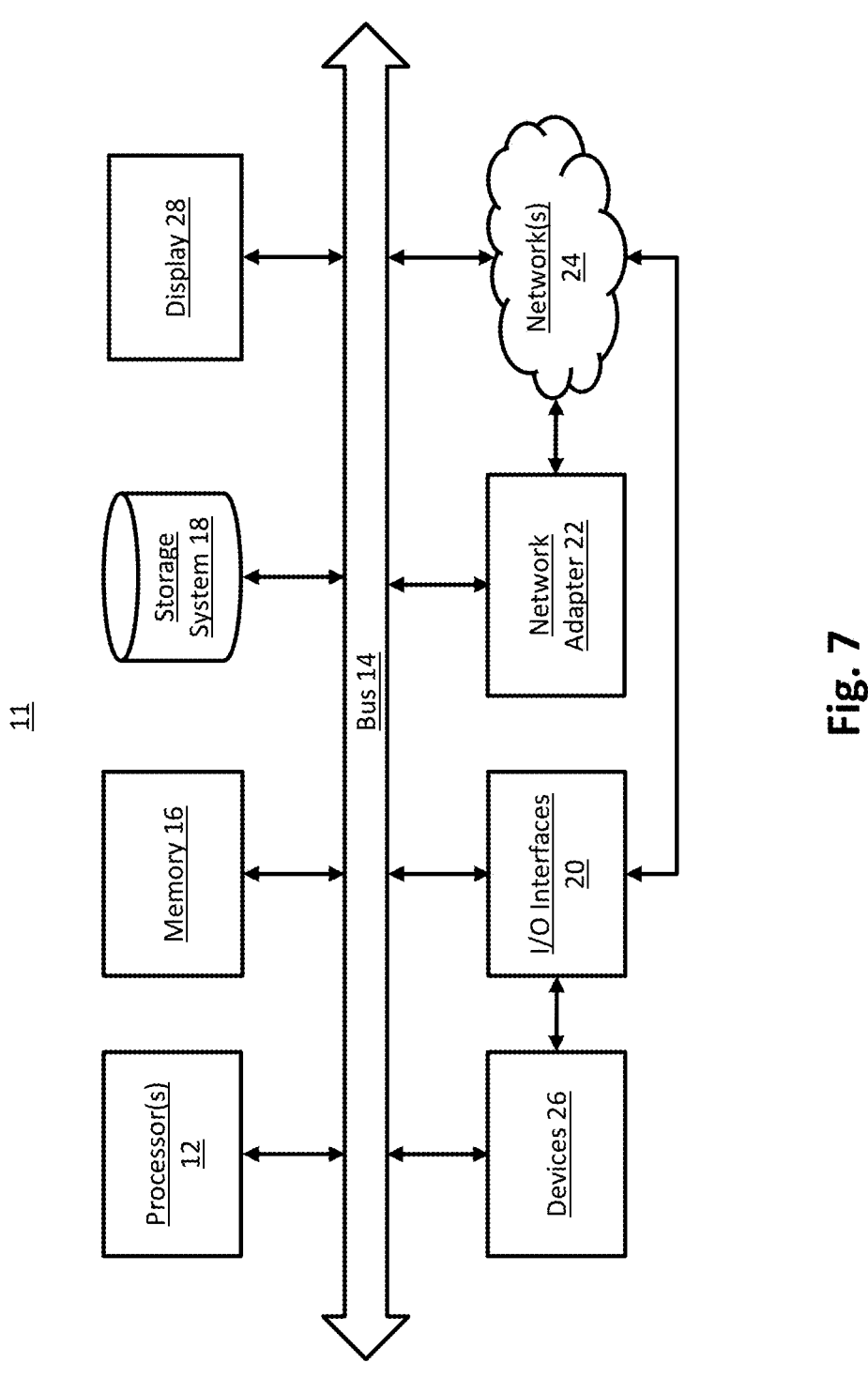
FIG. 7 illustrates a schematic of an example computer or processing system that may implement a quantum circuit for transformation of mixed state vectors in one embodiment of the present disclosure.

FIG. 7 illustrates a schematic of an example computer or processing system 11 that may implement a quantum circuit for transformation of mixed state vectors in one embodiment of the present disclosure. The computer system 11 is an example of a suitable processing system and is not intended to suggest any limitation as to the scope of use or functionality of embodiments of the methodology described herein. The computer system 11 shown may be operational with numerous other general-purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, quantum computing systems, hybrid systems including quantum computers and classical computers, and distributed cloud computing environments that include any of the above systems or devices, and the like. Classical computers among computer system 11 can execute classical computing processes by performing operations based on information encoded in bits. Quantum computers among computer system 11 can execute quantum computing processes by performing operations based on information encoded in qubits.

The computer system 11 may be described in the general context of computer system executable instructions, such as program modules, being implemented by a computer system. Generally, program modules may include routines, programs, objects, components, logic, data structures, and so on that perform particular tasks or implement particular abstract data types. The computer system 11 may be practiced in distributed cloud computing environments where tasks are performed by remote processing devices that are linked through a communications network. In a distributed cloud computing environment, program modules may be located in both local and remote computer system storage media including memory storage devices.

The components of computer system 11 may include, but are not limited to, one or more processors or processing units 12, a system memory 16, a bus 14, storage system(s) 18, I/O interface(s) 20, network adapter(s) 22, network 24, devices 26, and display(s) 28. Bus 14 may couple various components of computer system 10. The processor 12 may include modules (e.g., programming modules) that performs the methods described herein. The modules among processor 12 may be programmed into the integrated circuits of the processor 12, or loaded from memory 16, storage device 18, or network 24 or combinations thereof. Processor 12 can be, for example, a microprocessor, a microcontroller, a processor core, a multicore processor, central processing unit (CPU) of computing devices such as a classical computer and/or quantum computers, and/or other types of computer processing element.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Universal Serial Bus (USB), Video Electronics Standards Association (VESA) local bus, and Peripheral Component Interconnects (PCI) bus.

Computer system 11 may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system 11 may also communicate with one or more external devices 26 such as a keyboard, a pointing device, a display 28, network card, modem, etc. that enable a user to interact with computer system and/or that enable computer system 11 to communicate with one or more other computing devices. Devices 26 can be connected to components among computer system 11 via bus 14 and/or input/output (I/O) interfaces 20.

Computer system 11 can communicate with one or more networks 24 such as a local area network (LAN), a general wide area network (WAN), and/or a public network (e.g., the Internet) via network adapter 22 and/or I/O interfaces 20. Computer system 11 can communicate with networks 24 through wired connections (e.g., wires or cables connected to bus 14) or wireless connections (e.g., through network cards among I/O devices 20 and/or network adapter 22). Network adapter 22 can communicate with the other components of computer system 11 via bus 14. It should be understood that although not shown, other hardware and/or software components could be used in conjunction with computer system 10. Examples include, but are not limited to: field-programmable gate array (FPGA), system on chip (SoC), microcode, device drivers, redundant processing units, external disk drive arrays, RAID systems, tape drives, and data archival storage systems, etc.

Figure 8:
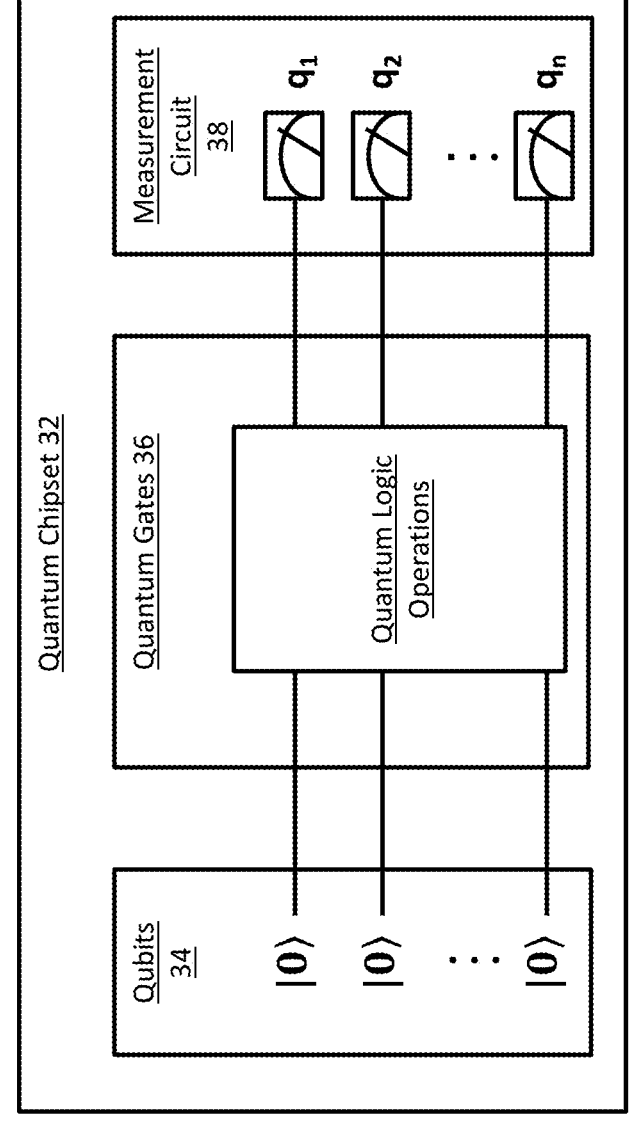
FIG. 8 illustrates a schematic of an example quantum computing system that may implement a quantum circuit for transformation of mixed state vectors in one embodiment of the present disclosure.

FIG. 8 illustrates a schematic of an example quantum computing system 30 that may implement a quantum circuit for transformation of mixed state vectors in one embodiment of the present disclosure. Quantum computing system 30 can be implemented by a quantum computer among processor 12 shown in FIG. 7, or coupled to network 24 shown in FIG. 7). Quantum computing system 30 can include a quantum chipset 32. Quantum chipset 32 can include one or more components configured to operate on a plurality of qubits 34. In an aspect, qubits 34 can be arranged in a two-dimensional or three-dimensional array, such as being arranged in a lattice structure. A two-dimensional qubit array can be formed on a surface of a two-dimensional wafer, and the qubits 34 can be arranged in a two-dimensional lattice structure and configured to communicate with one another. A three-dimensional device array can be formed by a stack of two-dimensional wafers, and qubits 34 can be arranged in a three-dimensional lattice structure and configured to communicate with one another via connections between the two-dimensional wafers.

Quantum chipset 32 can be a quantum computing core surrounded by an infrastructure to shield quantum chipset 32 from sources of electromagnetic noise, mechanical vibration, heat, and other sources of noise, which tend to degrade performance. Magnetic shielding can be used to shield the system components from stray magnetic fields, optical shielding can be used to shield the system components from optical noise, thermal shielding and cryogenic equipment can be used to maintain the system components at controlled temperature, etc. For example, an infrastructure that can surround quantum chipset 32 can be a refrigerator that can cool the quantum chipset to an operating temperature of quantum chipset 32.

The plurality of qubits 34 can be denoted as $q_1, q_2, \ldots, q_n$. Quantum chipset 32 can operate by performing quantum logic operations (e.g., using quantum gates 36) on qubits 34. Quantum gates 36 can include one or more single-qubit gates and/or two-qubit gates. Quantum circuits can be formed based on quantum gates 36, and quantum chipset 32 can operate the quantum circuits to perform quantum logic operations on single qubits or conditional quantum logic operations on multiple qubits. Conditional quantum logic can be performed in a manner that entangles the qubits. Control signals can be received by quantum chipset 32, and quantum chipset 32 can use the received control signals to manipulate the quantum states of individual qubits and the joint states of multiple qubits.

Measurement circuit 38 can include circuit components configured to measure a basis qubits 34, where the basis is a measurement that will yield a classical bit result. Each measurement performed by measurement circuit 38 can be probabilistic, and can be read out to a device (e.g., a classical computer) connected to quantum computing system 30. A plurality of measurement results provided by measurement circuit 38 can result in a probabilistic outcome.

Figure 9:
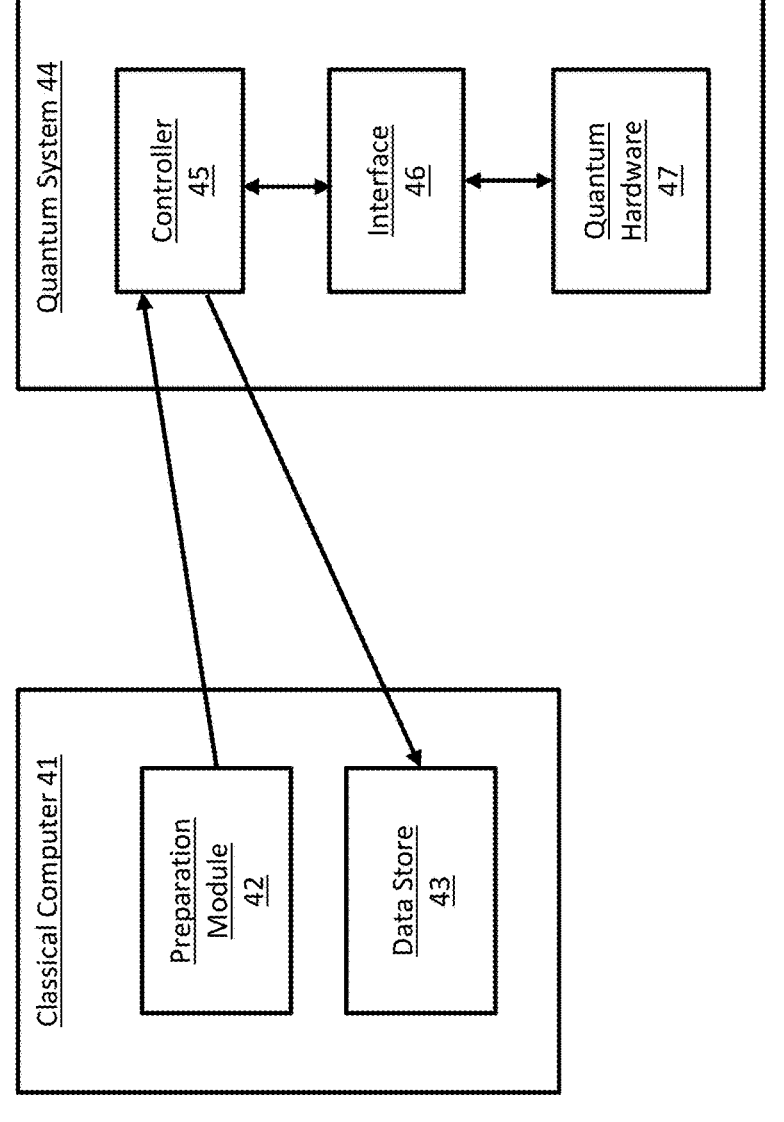
FIG. 9 illustrates a block diagram of an example system that can facilitate execution of a quantum algorithm in one embodiment of the present disclosure.

FIG. 9 illustrates a block diagram of an example system 40 that can facilitate execution of a quantum algorithm. As shown, a classical computer 41 can be electronically integrated, via any suitable wired and/or wireless electronic connection, with a quantum system 44. The quantum system 44 can be any suitable set of components capable of performing quantum operations on a physical system. In the example embodiment depicted in FIG. 9, quantum system 44 can include controller 45 (e.g., a local classical controller), an interface 46 (e.g., a classical-quantum interface), and quantum hardware 47. In some embodiments, all or part of each of the controller 45, the interface 46, and quantum hardware 47 may be located in a cryogenic environment to aid in the performance of the quantum operations.

Controller 45 may be any combination of digital computing devices capable of performing a quantum computation, such as executing a quantum circuit, in combination with interface 46. Such digital computing devices may include digital processors and memory for storing and executing quantum commands using interface 46. Additionally, such digital computing devices may include devices having communication protocols for receiving such commands and sending results of the performed quantum computations to classical computer 41. Additionally, the digital computing devices may include communications interfaces with the interface 46. Controller 45 can be configured to receive classical instructions (e.g., from classical computer 41) and convert the classical instructions into drive signals. The drive signals can be used for driving or manipulating qubits and/or quantum gates and/or circuits among quantum hardware 47.

Interface 46 may be a combination of devices capable of receiving command signals from controller 45 and converting those signals into quantum operations for execution on the quantum hardware 47. Additionally, interface 46 may be capable of converting signals received from the quantum hardware 47 into digital signals capable of processing and transmitting by controller 45. Devices included in interface 46 may include, but are not limited to, digital-to-analog converters, analog-to-digital converters, waveform generators, attenuators, amplifiers, optical fibers, lasers, and filters.

Quantum hardware 47 may be any hardware capable of using quantum states to process information. Such hardware may include a collection of qubits, and mechanisms to couple/entangle such qubits, in order to process information using said quantum states. Such qubits may include, but are not limited to, charge qubits, flux qubits, phase qubits, spin qubits, and trapped ion qubits.

The classical computer 41 can be any suitable combination of computer-executable hardware and/or computer-executable software capable of executing a preparation module 42 to perform quantum computations with data contained in a data store 43 as part of building and implementing a machine learning protocol. Data store 43 may be a repository for data to be analyzed using a quantum computing algorithm, as well as the results of such analysis. In an example system, classical computer 41 can be a laptop computer, a desktop computer, a vehicle-integrated computer, a smart mobile device, a tablet device, and/or any other suitable classical computing device. Additionally or alternatively, classical computer 41 may also operate as part of a cloud computing service model, such as Software as a Service (SaaS), Platform as a Service (PaaS), or Infrastructure as a Service (IaaS). Classical computer 102 may also be located in a cloud computing deployment model, such as a private cloud, community cloud, public cloud, or hybrid cloud. Aspects of this embodiment are described in more detail below with reference to FIG. 10 and FIG. 11.

Preparation module 42 may be a program or module capable of preparing classical data from data store 43 to be analyzed as part of the implementation of a quantum circuit. Preparation module 42 may be instantiated as part of a larger algorithm, such as a function call of an application programming interface (API) or by parsing a hybrid classical-quantum computation into aspects for quantum and classical calculation. Preparation module 42 may generate instructions for creating a quantum circuit using quantum gates in quantum hardware 47. In an embodiment, such instructions may be stored by controller 41, and may instantiate the execution of the components of interface 46 so that the quantum operations of the quantum gates may be executed on quantum hardware 47.

Figure 10:
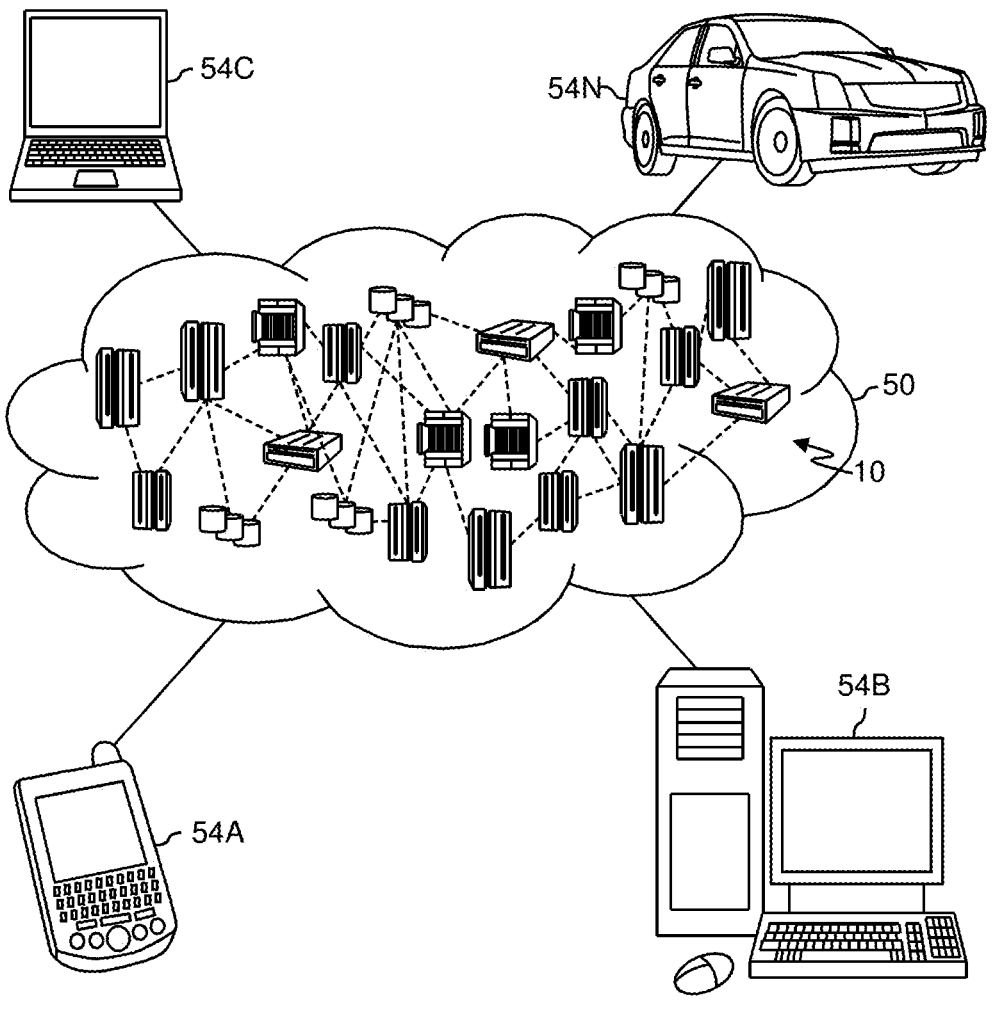
FIG. 10 depicts a cloud computing environment according to an embodiment of the present invention.

FIG. 10 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
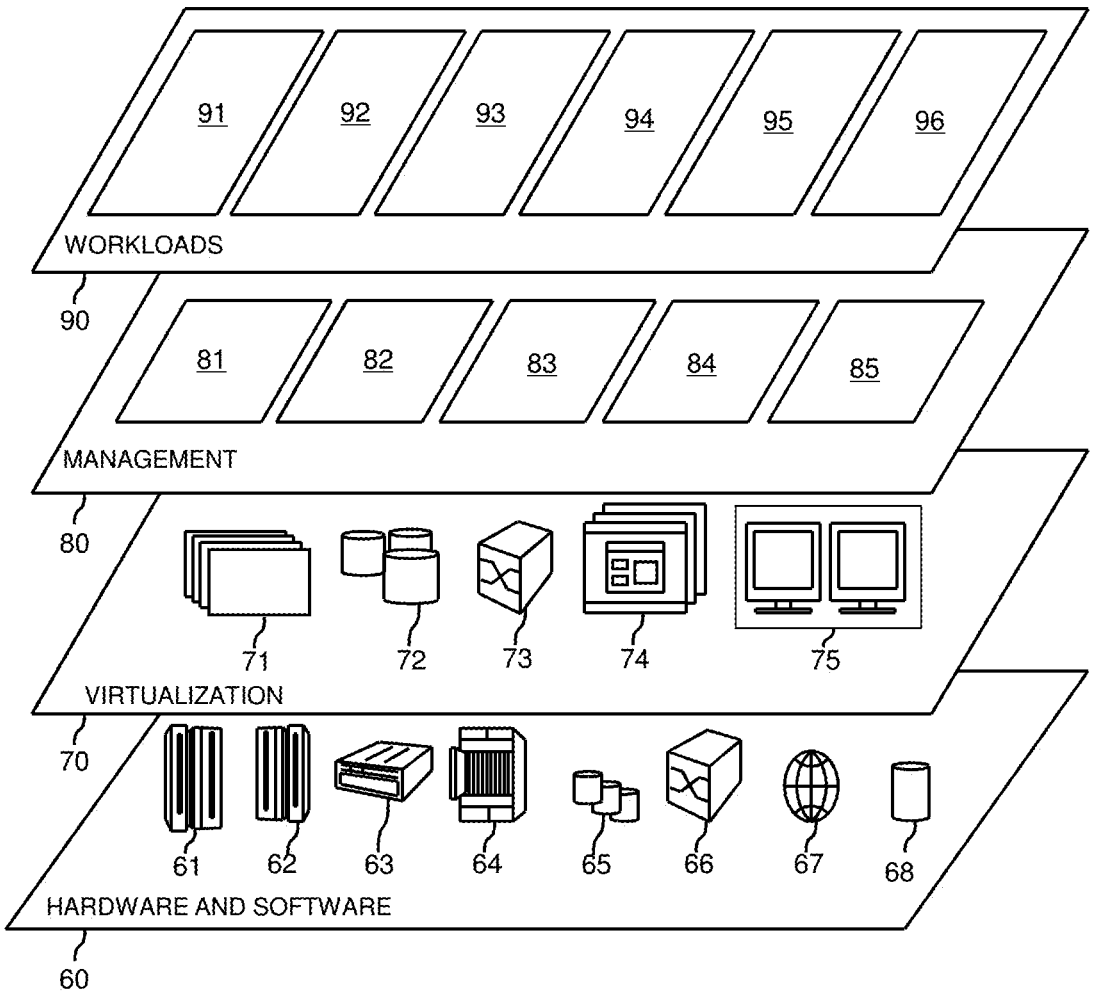
FIG. 11 depicts abstraction model layers according to an embodiment of the present invention.

FIG. 11 depicts abstraction model layers according to an embodiment of the present invention. Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mixed state vector transformation 96.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more instructions for implementing the specified logical function(s). In some alternative implementations, the functions noted in the blocks may occur out of the order noted in the Figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a controller configured to generate a command signal;
quantum hardware including at least a first set of qubits and a second set of qubits; and
an interface connected to the controller and the quantum hardware, the interface being configured to control the quantum hardware based on the command signal received from the controller to:
sample an input vector represented by the first set of qubits, wherein the input vector includes mixed states with different Hamming weights;
entangle the first set of qubits to the second set of qubits, wherein the second set of qubits represent a count of nonzero elements in the input vector; and
generate an output vector based on the entanglement of the first set of qubits to the second set of qubits, wherein the output vector includes one or more states having a specific Hamming weight.

2. The apparatus of claim 1, wherein:
the input vector corresponds to a dataset comprising a plurality of data points, and a topology of the dataset is represented by a simplicial complex;
the simplicial complex comprises n vertices;
the first set of qubits comprises n qubits; and
the second set of qubits comprises log(n) qubits.

3. The apparatus of claim 2, wherein the output vector projects simplices of an order k the simplicial complex based on the entanglement of the first set of qubits and the second set of qubits.

4. The apparatus of claim 1, wherein the quantum hardware comprises a set of controlled-NOT (CNOT) gates that entangles the first set of qubits to the second set of qubits.

5. The apparatus of claim 1, wherein the quantum hardware comprises:
a set of Hadamard gates configured to transform the first set of qubits into superposition quantum state;
a set of controlled-NOT (CNOT) gates configured to entangle the first set of qubits to the second set of qubits; and
a set of phase gates configured to perform phase change on the second set of qubits based on states of the first set of qubits, wherein the phase change increments the count represented by the second set of qubits.

6. The apparatus of claim 5, wherein the interface is configured to control the quantum hardware to:

receive a set of random binary numbers;

generate a set of random state vectors based on the set of random binary numbers; and iteratively sample a random state vector among the set of random state vectors, wherein the sampled random state vector is the input vector.

7. The apparatus of claim 6, wherein the interface is configured to control the quantum hardware to sample the random state vector by:

randomly inverting one or more of the first set of qubits; and applying the set of Hadamard gates to the first set of qubits to produce the random state vector.

8. The apparatus of claim 1, wherein the quantum circuit comprises a set of measurement circuits configured to measure the second set of qubits.

9. The apparatus of claim 1, wherein the interface is configured to control the quantum hardware to:

generate a vector that includes one or more states having a random Hamming weight;

measure the second set of qubits;

in response to a result of the measurement indicating the random Hamming weight is same as the specific Hamming weight, output the generated vector as the output vector; and in response to a result of the measurement indicating the random Hamming weight is different from the specific Hamming weight, sample a next input vector without generating the output vector.

10. A system comprising:

a first computing device configured to process data encoded in binary data;

a second computing device configured to be in communication with the first computing device, the second computing device being configured to process data encoded in qubits, wherein the second computing device comprises:

a controller configured to at least:

receive an instruction from the first computing device; and generate a command signal based on the instruction;

quantum hardware including a plurality of qubits; and an interface connected to the controller and the quantum hardware, the interface being configured to control the quantum hardware based on the command signal received from the controller to:

sample an input vector represented by the first set of qubits, wherein the input vector includes mixed states with different Hamming weights;

entangle the first set of qubits to the second set of qubits, wherein the second set of qubits represent a count of nonzero elements in the input vector; and generate an output vector based on the entanglement of the first set of qubits to the second set of qubits, wherein the output vector includes one or more states having a specific Hamming weight.

11. The system of claim 10, wherein:

the input vector corresponds to a dataset comprising a plurality of data points, and a topology of the dataset is represented by a simplicial complex;

the simplicial complex comprises n vertices;

the first set of qubits comprises n qubits; and the second set of qubits comprises log(n) qubits.

12. The system of claim 11, wherein the output vector projects simplices of an order k the simplicial complex based on the entanglement of the first set of qubits and the second set of qubits.

13. The system of claim 10, wherein the second computing device comprises a set of controlled-NOT (CNOT) gates that entangles the first set of qubits to the second set of qubits.

14. The system of claim 10, wherein the second computing device comprises:

a set of Hadamard gates configured to transform the first set of qubits into superposition quantum state;

a set of controlled-NOT (CNOT) gates configured to entangle the first set of qubits to the second set of qubits; and a set of phase gates configured to perform phase change on the second set of qubits based on states of the first set of qubits, wherein the phase change increments the count represented by the second set of qubits.

15. The system of claim 14, wherein the second computing device is configured to:

receive a set of random binary numbers from the first computing device;

generate a set of random state vectors based on the set of random binary numbers; and iteratively sample a random state vector among the set of random state vectors, wherein the sampled random state vector is the input vector.

16. The system of claim 15, wherein the second computing device is configured to sample the random state vector by:

randomly inverting one or more of the first set of qubits; and applying the set of Hadamard gates to the first set of qubits to produce the random state vector.

17. The system of claim 15, wherein the first computing device is configured to generate the set of random binary numbers.

18. The system of claim 10, wherein the second computing device comprises a set of measurement circuits configured to measure the second set of qubits.

19. The system of claim 10, wherein the second computing device is configured to:

generate a vector that includes one or more states having a random Hamming weight;

measure the second set of qubits;

in response to a result of the measurement indicating the random Hamming weight is same as the specific Hamming weight, the second computing device outputs the generated vector as the output vector; and in response to a result of the measurement indicating the random Hamming weight is different from the specific Hamming weight, the second computing device samples a next input vector without generating the output vector.

20. A method for operating a quantum system, the method comprising:

receiving, by a controller of a quantum system, an instruction;

generating, by the controller of the quantum system, a command signal based on the instruction;

converting, by an interface of the quantum system, the command signal into a quantum operation; and based on the quantum operation, controlling, by the interface of the quantum system, quantum hardware of the quantum system to:

sample an input vector having mixed states with different Hamming weights;

entangle a first set of qubits to a second set of qubits, wherein the first set of qubits represents elements of the input vector, and the second set of qubits represent a count of nonzero elements in the input vector; and generate an output vector based on the entanglement of the first set of qubits to the second set of qubits, wherein the output vector includes one or more states having a specific Hamming weight.

21. The method of claim 20, wherein:

the input vector corresponds to a dataset comprising a plurality of data points, and a topology of the dataset is represented by a simplicial complex;

the simplicial complex comprises n vertices;

the first set of qubits comprises n qubits;

the second set of qubits comprises $\log(n)$ qubits; and the output vector projects simplices of an order k the simplicial complex based on the entanglement of the first set of qubits and the second set of qubits.

22. The method of claim 20, further comprising:

transforming the first set of qubits into superposition quantum state;

entangling the first set of qubits in superposition quantum state to the second set of qubits; and performing phase change on the second set of qubits based on states of the first set of qubits, wherein the phase change increments the count represented by the second set of qubits.

23. The method of claim 22, further comprising:

receiving a set of random binary numbers;

generating a set of random state vectors based on the set of random binary numbers; and iteratively sampling a random state vector among the set of random state vectors, wherein the sampled random state vector is the input vector.

24. The method of claim 23, wherein sampling the input vector comprises:

randomly inverting one or more of the first set of qubits; and applying the set of Hadamard gates to the first set of qubits to produce the random state vector.

25. The method of claim 20, further comprising:

generating a vector that includes one or more states having a random Hamming weight;

measuring the second set of qubits;

in response to a result of the measurement indicating the random Hamming weight is same as the specific Hamming weight, outputting the generated vector as the output vector; and in response to a result of the measurement indicating the random Hamming weight is different from the specific Hamming weight, sampling a next input vector without generating the output vector.

* * * * *